US011827360B2

(12) United States Patent
Satterfield et al.

(10) Patent No.: US 11,827,360 B2
(45) Date of Patent: Nov. 28, 2023

(54) SLIDE-OUT TRAY TABLE WITH INTERLOCK ASSEMBLY

(71) Applicant: S&S Numerical Control, Inc., Northridge, CA (US)

(72) Inventors: John Satterfield, Northridge, CA (US); Neal Silverwood, Cardiff (GB); Kyle Bettenhausen, Laguna Hills, CA (US); Gary Senechal, Seattle, WA (US); Dane Sandifer, Santa Barbara, CA (US)

(73) Assignee: S & S Numerical Control, Inc., Northridge, CA (US)

( * ) Notice: Subject to any disclaimer, the term of this patent is extended or adjusted under 35 U.S.C. 154(b) by 0 days.

(21) Appl. No.: 17/484,984

(22) Filed: Sep. 24, 2021

(65) Prior Publication Data

US 2022/0135230 A1    May 5, 2022

Related U.S. Application Data

(60) Provisional application No. 63/083,780, filed on Sep. 25, 2020.

(51) Int. Cl.
  *B64D 11/06*    (2006.01)
(52) U.S. Cl.
  CPC .............................. *B64D 11/0638* (2014.12)
(58) Field of Classification Search
  CPC .... B65D 11/0638; B60N 3/001; B60N 3/004; A47B 31/06

(Continued)

(56) References Cited

U.S. PATENT DOCUMENTS 2,517,256 A  *  8/1950  Summers ................ D06F 81/06
                                                       108/139
4,085,961 A  *  4/1978  Brown .................... B65D 25/24
                                                        217/60 B (Continued)

FOREIGN PATENT DOCUMENTS

| CA | 2465972 A1 | 10/2004 |
|---|---|---|
| DE | 3931167 A1 * | 3/1991 |
| WO | 2011/089558 A1 | 7/2011 |

OTHER PUBLICATIONS

International Searching Authority/EPO, International Search Report for PCT/US2021/052084, dated Jan. 5, 2022, Rijswijk, The Netherlands.

(Continued)

*Primary Examiner* — Jose V Chen
(74) *Attorney, Agent, or Firm* — Matthew J. Spark; Stefan J. Kirchanski; Zuber Lawler LLP

(57) ABSTRACT

An interlock assembly for a tray table of an aircraft includes a first interlock configured to be moved from an unlocked position to a locked position by rotation of a table leaf of the tray table from a stowed position toward a deployed position of the table leaf. The first interlock is configured to be moved from the locked position of the first interlock to the unlocked position of the first interlock by rotation of the table leaf into the deployed position. The interlock assembly includes a second interlock configured to be moved from an unlocked position of the second interlock to a locked position of the second interlock by rotation of the table leaf into the deployed position.

20 Claims, 20 Drawing Sheets

(58) Field of Classification Search
USPC .......................................... 108/42, 44, 139
See application file for complete search history.

(56) References Cited

U.S. PATENT DOCUMENTS

| | | | | |
|---|---|---|---|---|
| 4,359,004 A * | 11/1982 | Chappell | ................. | A47C 7/70 297/188.2 |
| 5,503,086 A * | 4/1996 | Hoffman | ................. | A47B 9/00 108/138 |
| 6,488,248 B1 * | 12/2002 | Watt | ................. | A47B 21/0314 108/138 |
| 7,306,282 B2 | 12/2007 | Salzer | | |
| 7,675,742 B2 * | 3/2010 | Wu | ................. | G06F 1/16 345/169 |
| 7,963,231 B2 * | 6/2011 | Osborne | ................. | A47B 5/006 108/42 |
| 8,997,660 B2 * | 4/2015 | Satterfield | ................. | A47B 13/081 108/73 |
| 10,875,652 B2 * | 12/2020 | Chuang | ................. | A47B 46/00 |
| 2005/0045071 A1 * | 3/2005 | Lindstrom | ................. | B60N 3/002 108/44 |
| 2010/0319588 A1 * | 12/2010 | Hanna | ................. | B60N 3/001 108/20 |
| 2011/0067606 A1 * | 3/2011 | Sundarrao | ................. | A47C 7/705 108/44 |
| 2012/0199051 A1 * | 8/2012 | Edinger | ................. | A47B 11/00 74/82 |
| 2013/0093221 A1 * | 4/2013 | Ligonniere | ................. | B64D 11/06 297/173 |
| 2014/0261097 A1 * | 9/2014 | Eilers | ................. | B60N 3/001 108/44 |
| 2014/0305349 A1 * | 10/2014 | Lippert | ................. | B60N 3/001 108/44 |
| 2014/0360412 A1 * | 12/2014 | Zaccai | ................. | A47B 83/045 108/142 |
| 2016/0375810 A1 * | 12/2016 | Kong | ................. | B60N 3/002 297/145 |
| 2017/0354242 A1 * | 12/2017 | Smythe | ................. | B60N 3/002 |
| 2018/0305023 A1 * | 10/2018 | Moulton | ................. | B64D 11/0605 |
| 2019/0061954 A1 * | 2/2019 | Miedema | ................. | A47B 3/00 |
| 2019/0143870 A1 * | 5/2019 | Kondrad | ................. | B60N 2/32 108/44 |
| 2021/0316866 A1 * | 10/2021 | Carlioz | ................. | B64D 11/0605 |
| 2022/0135230 A1 * | 5/2022 | Satterfield | ................. | B64D 11/0638 108/44 |

OTHER PUBLICATIONS

International Searching Authority/EPO, International Preliminary Report on Patentability and Written Opinion of the International Searching Authority for PCT/US2021/052084, dated Mar. 28, 2023, Munich, Germany.
International Searching Authority/US, International Preliminary Report on Patentability and Written Opinion of the International Searching Authority for PCT/US2021/052058, dated Mar. 28, 2023, Arlington, US.

* cited by examiner

SLIDE-OUT TRAY TABLE WITH INTERLOCK ASSEMBLY

BACKGROUND

Slide-out tray tables for aircraft include telescoping bases that enable the tray table to be extended outward from a stowed position within a structure that is adjacent (e.g., in front of, alongside, etc.) the user's seat. Once the tray table has been pulled out to the extended position, the table leaf of the tray table is rotated to position the table leaf for use. However, during various movements of the base and the table leaf, the table leaf may come into contact with the adjacent structure, which may damage the tray table and/or the adjacent structure. Interlock assemblies are known for restricting linear movement of the base and/or rotation of the table leaf in certain positions of the tray table. However, known interlock assemblies may be insufficiently intuitive to prevent some users from mishandling, and thereby possibly damaging, the tray table. Moreover, known interlock assemblies may be relatively heavy and/or complex.

SUMMARY

In one aspect, an interlock assembly for a tray table of an aircraft is provided. The interlock assembly includes a first interlock configured to be moved from an unlocked position to a locked position by rotation of a table leaf of the tray table from a stowed position toward a deployed position of the table leaf. The first interlock is configured to be moved from the locked position of the first interlock to the unlocked position of the first interlock by rotation of the table leaf into the deployed position. The interlock assembly includes a second interlock configured to be moved from an unlocked position of the second interlock to a locked position of the second interlock by rotation of the table leaf into the deployed position.

In another aspect, a slide-out tray table for an aircraft is provided. The tray table includes a telescoping base configured to expand outwardly and retract inwardly between an extended position and a retracted position of the tray table. The tray table includes a table leaf mounted to the base such that the table leaf is slidable between the extended and retracted positions of the tray table. The table leaf is selectively rotatably between a stowed position and a deployed position. The tray table includes an interlock assembly that includes a first interlock movable between an unlocked position and a locked position. The first interlock is operatively connected to the table leaf such that rotation of the table leaf from the stowed position toward the deployed position moves the first interlock to the locked position. The interlock assembly includes a second interlock movable between an unlocked position and a locked position of the second interlock. The second interlock is operatively connected to the table leaf such that rotation of the table leaf into the deployed position moves the second interlock to the locked position of the second interlock.

In another aspect, a method of configuring a slide-out tray table for an aircraft is provided. The method includes operatively connecting a first interlock of the tray table to a table leaf of the tray table such that rotation of the table leaf from a stowed position toward a deployed position of the table leaf moves the first interlock from an unlocked position of the first interlock to a locked position of the first interlock. The method further includes operatively connecting a second interlock of the tray table to the table leaf such that rotation of the table leaf into the deployed position moves the second interlock from an unlocked position of the second interlock to a locked position of the second interlock.

DETAILED DESCRIPTION

Figure 1:
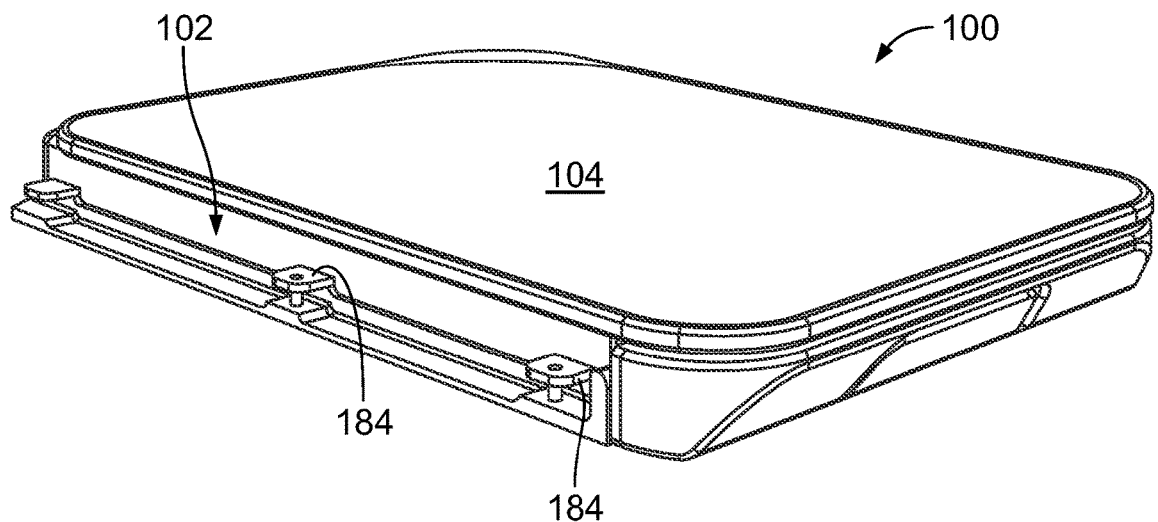
FIG. 1 is a perspective view illustrating a slide-out tray table for an aircraft according to an implementation.

The foregoing summary, as well as the following detailed description of certain embodiments and implementations will be better understood when read in conjunction with the appended drawings. As used herein, an element or step recited in the singular and preceded by the word "a" or "an" should be understood as not necessarily excluding the plural of the elements or steps. Further, references to "one embodiment" or "one implementation" are not intended to be interpreted as excluding the existence of additional embodiments or implementations that also incorporate the recited features. Moreover, unless explicitly stated to the contrary, embodiments "comprising" or "having" an element or a plurality of elements having a particular property can include additional elements not having that property.

While various spatial and directional terms, such as "top," "bottom," "upper," "lower," "vertical," and the like are used to describe embodiments and implementations of the present disclosure, it is understood that such terms are merely used with respect to the orientations shown in the drawings. The orientations can be inverted, rotated, or otherwise changed, such that a top side becomes a bottom side if the structure is flipped 180 degrees, becomes a left side or a right side if the structure is pivoted 90°, and the like.

Certain implementations of the present disclosure provide an interlock assembly for a tray table of an aircraft. The interlock assembly includes a first interlock configured to be moved from an unlocked position to a locked position by rotation of a table leaf of the tray table from a stowed position toward a deployed position of the table leaf. The first interlock is configured to be moved from the locked position of the first interlock to the unlocked position of the first interlock by rotation of the table leaf into the deployed position. The interlock assembly includes a second interlock configured to be moved from an unlocked position of the second interlock to a locked position of the second interlock by rotation of the table leaf into the deployed position.

Certain implementations of the present disclosure provide a method of configuring a slide-out tray table for an aircraft. The method includes operatively connecting a first interlock of the tray table to a table leaf of the tray table such that rotation of the table leaf from a stowed position toward a deployed position of the table leaf moves the first interlock from an unlocked position of the first interlock to a locked position of the first interlock. The method further includes operatively connecting a second interlock of the tray table to the table leaf such that rotation of the table leaf into the deployed position moves the second interlock from an unlocked position of the second interlock to a locked position of the second interlock.

Certain implementations of the present disclosure provide interlock assemblies that operate in an unconventional manner to limit movement of the base and/or table leaf of a slide-out tray table in certain positions of the tray table. Certain implementations of the present disclosure prevent, or reduce the likelihood of, damage to the tray table and/or adjacent structures of the aircraft, for example caused by movement of the base and/or the table leaf in certain positions of the tray table, mishandling of the tray table, etc.

Certain implementations of the present disclosure provide slide-out tray tables that are more intuitive to use, for example as compared to at least some know slide-out tray tables. Certain implementations of the present disclosure provide slide-out tray tables having improved user experience, for example as compared to at least some known slide-out tray tables. Certain implementations of the present disclosure reduce the weight and/or complexity of interlock assemblies of slide-out tray tables, for example as compared to at least some known interlock assemblies. Certain implementations of the present disclosure provide interchangeable components that reduce maintenance costs, for example as compared to at least some known slide-out tray tables.

Figure 2:
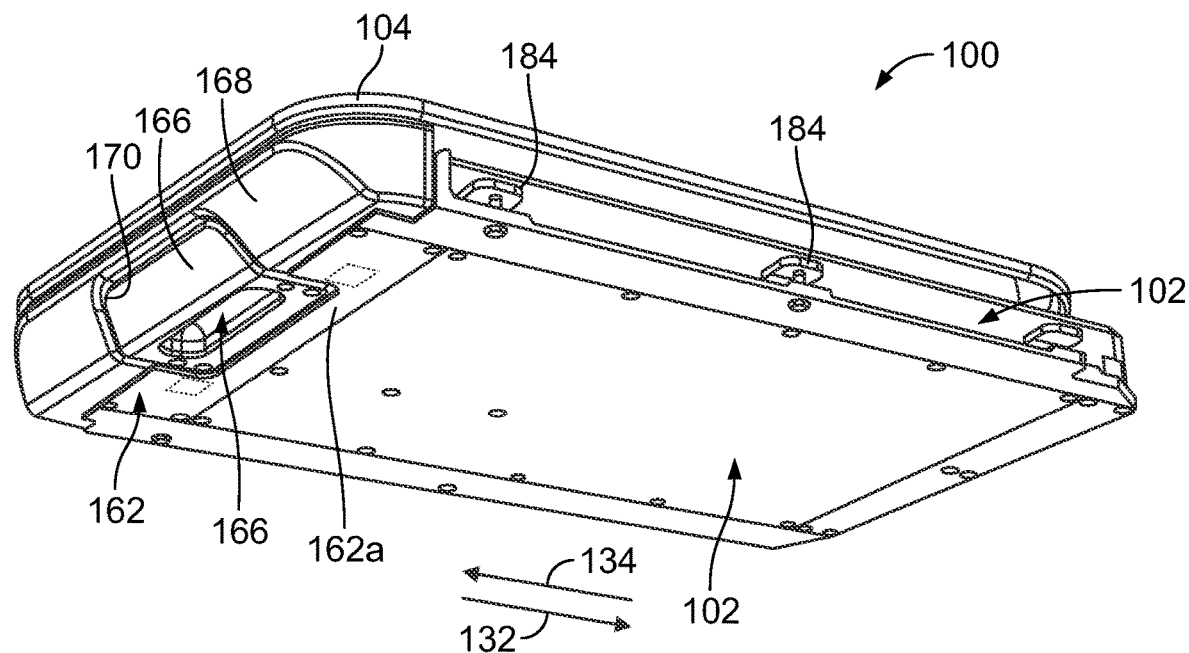
FIG. 2 is another perspective view illustrating the slide-out tray table shown in FIG. 1 according to an implementation.

With references now to the figures, perspective views of a slide-out tray table 100 for an aircraft (e.g., the aircraft 110 shown in FIGS. 3 and 4, the aircraft 500 shown in FIG. 19, etc.) are provided in FIGS. 1 and 2. The tray table 100 includes a telescoping base 102, a table leaf 104 mounted to the base 102, and an interlock assembly 106. The interlock assembly 106 is not visible in FIGS. 1 and 2 but will be described in more detail below with respect to FIGS. 6-12. For example, the interlock assembly 106 is configured to limit movement of the tray table 100 toward a stowed position of the tray table 100 (e.g., past an egress position of the tray table 100, when the table leaf 104 is in an intermediate position, etc.). Moreover, and for example, the interlock assembly 106 is configured to limit rotation of the table leaf 104 from a deployed position of the table leaf 104 toward a stowed position of the table leaf 104 (e.g., when the tray table 100 is in the egress position, etc.).

Figure 3:
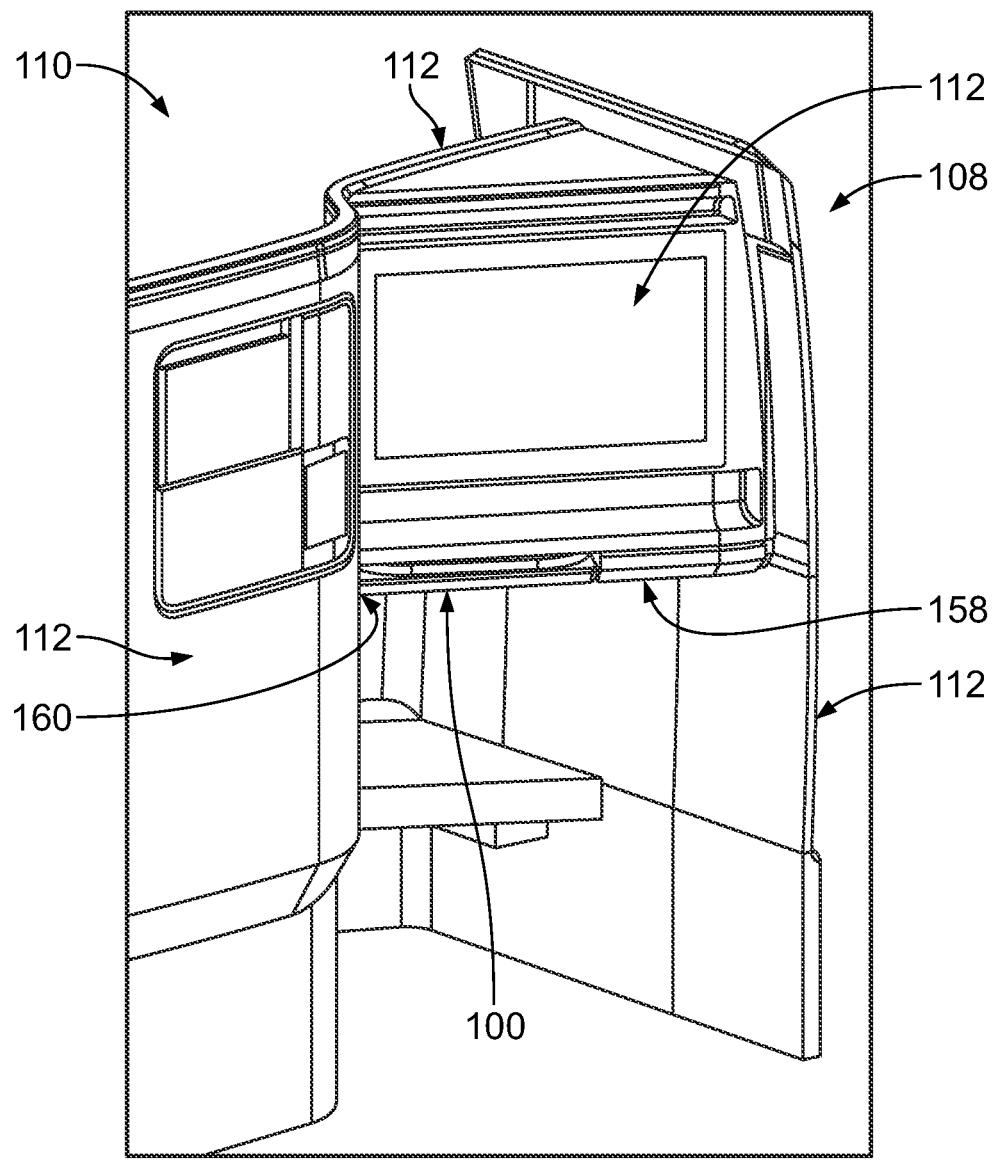
FIG. 3 is a perspective view of a portion of a passenger compartment of an aircraft according to an implementation.

FIGS. 1 and 2 illustrate the tray table 100 in the stowed position. The stowed position of the tray table 100 will also be referred to herein as a "retracted position" of the tray table 100. The tray table 100 is configured to be mounted within the passenger compartment of an aircraft adjacent (e.g., in front of, alongside, on the back of, etc.) a seat. For example, FIGS. 3 and 4A-4E illustrate the tray table 100 shown in FIGS. 1 and 2 mounted within an exemplary passenger compartment 108 of an exemplary aircraft 110. The tray table 100 is shown in FIG. 3 mounted to a seating structure 112 of the passenger compartment 108 such that the tray table 100 (shown in the stowed position) is mounted in front of a seat 114 (not shown in FIG. 3) for use by an occupant of the seat 114. The geometry and arrangement of the seating structure 112, as well as the relative location and orientation of the tray table 100 relative to the seat 114, are meant merely as examples thereof. The tray table 100 is not limited to being mounted in front of a seat, nor is the tray table 100 limited to use with the particular example of the seating structure 112 shown in FIGS. 3 and 4A-4E. Rather, any other arrangement that enables the tray table 100 to function as described and/or herein may be provided (e.g., the tray table 100 may be mounted alongside a seat for use by an occupant of the seat, etc.)

Figure 5A:
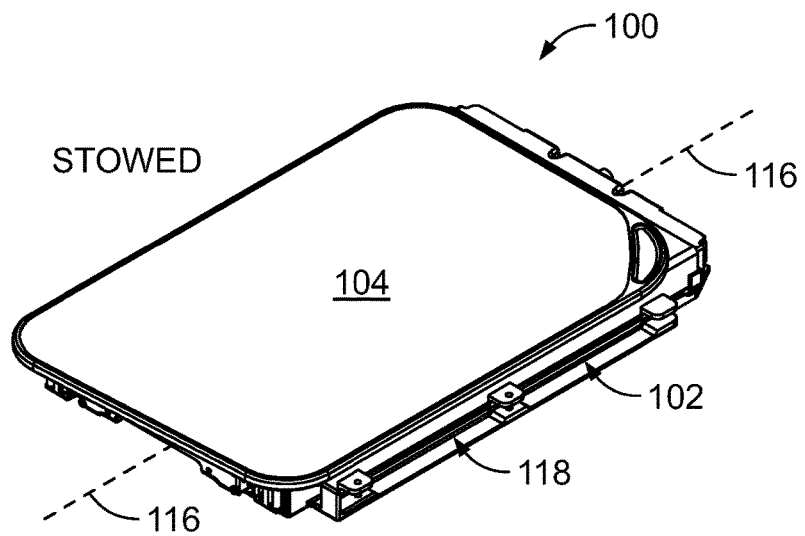
FIGS. 5A-5D are a series of perspective views illustrating the slide-out tray table shown in FIGS. 1 and 2 according to an implementation.
Figure 5B:
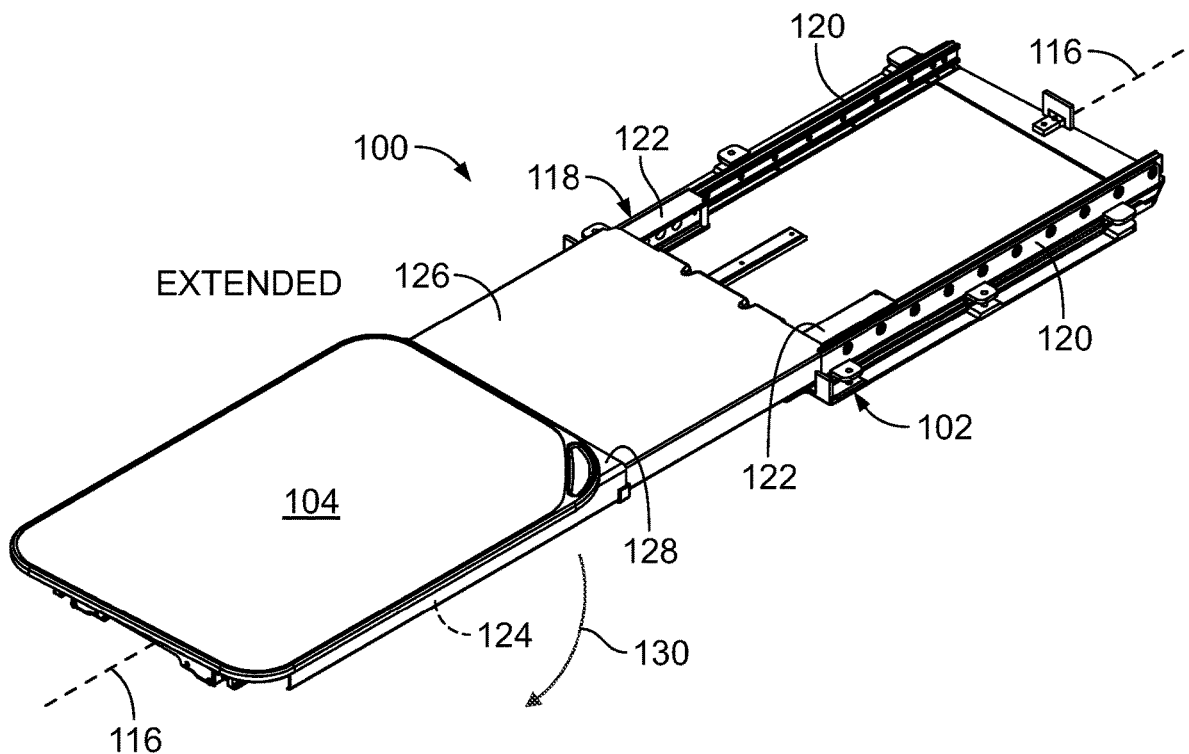
Figure 5C:
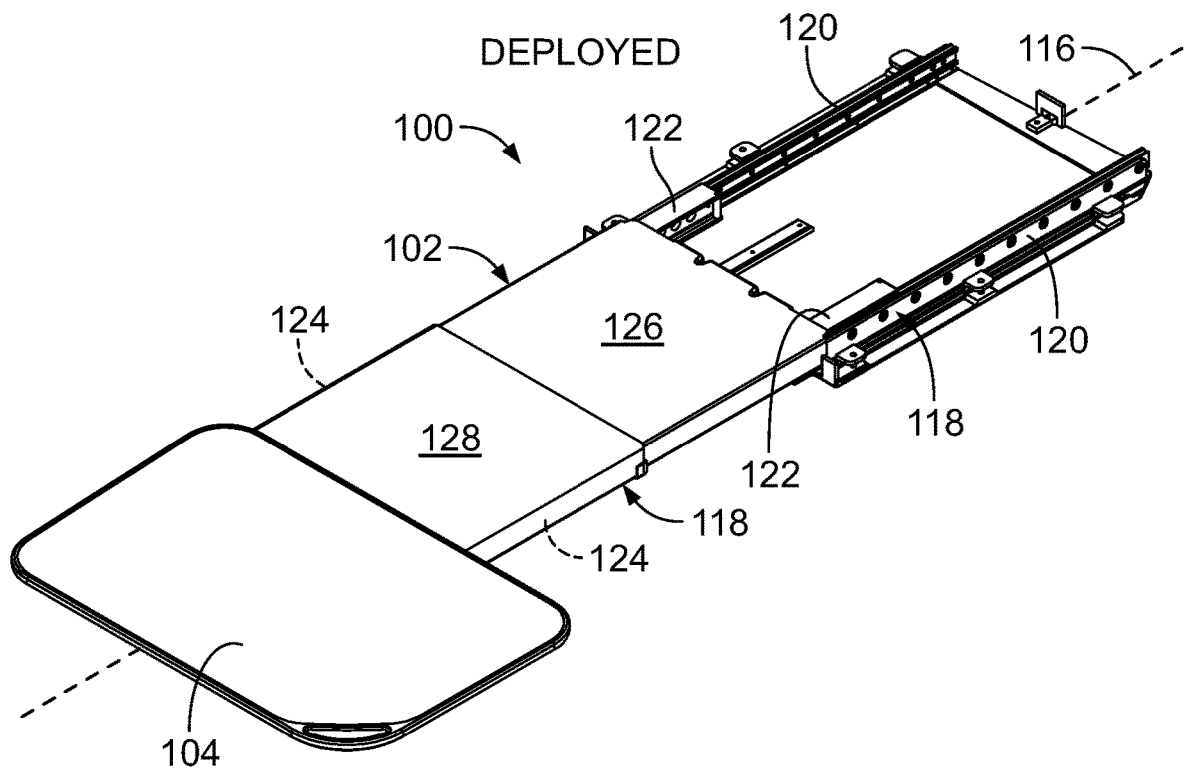

Referring now to FIGS. 5A-5D, the tray table 100 is moveable between the stowed position and a deployed position. FIG. 5A illustrates the tray table 100 in the stowed position, while FIG. 5C illustrates the tray table 100 in the deployed position. To move the tray table 100 to the deployed position (e.g., deploy the tray table 100 for use, etc.), the tray table 100 is moveable from the stowed position to an extended position of the tray table 100, which is shown in FIG. 5B. For example, the base 102 of the tray table 100 is configured to telescope inwardly and outwardly along a longitudinal axis 116 to move the tray table 100 between the stowed position shown in FIG. 5a and the extended position shown in FIG. 5B. In other words, the base 102 of the tray table 100 is configured to expand outwardly and retract inwardly along the longitudinal axis 116 between the stowed position of the tray table 100 and the extended position of the tray table 100.

Figure 5D:
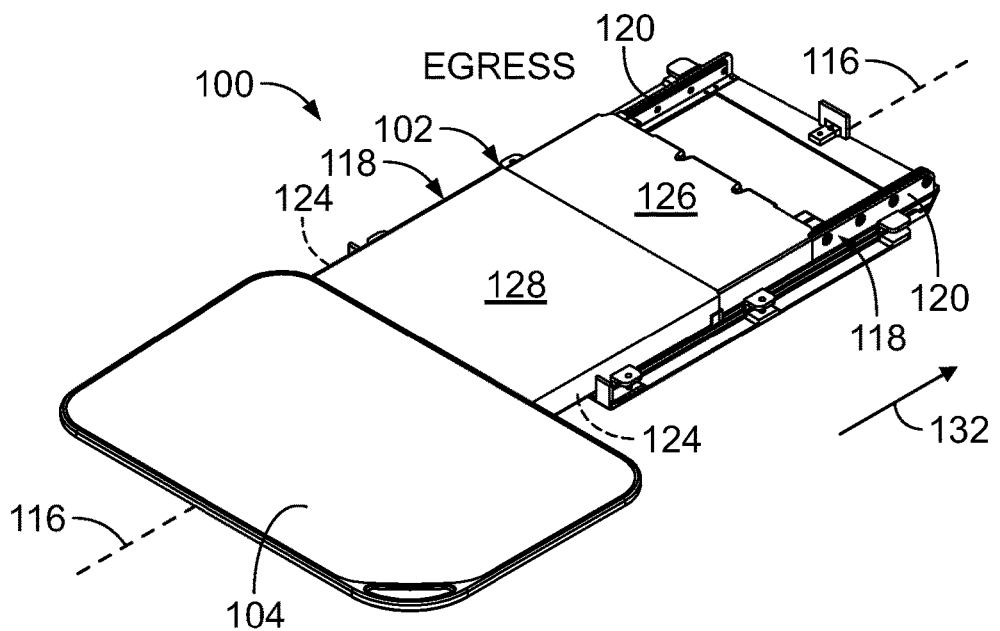
Figure 6:
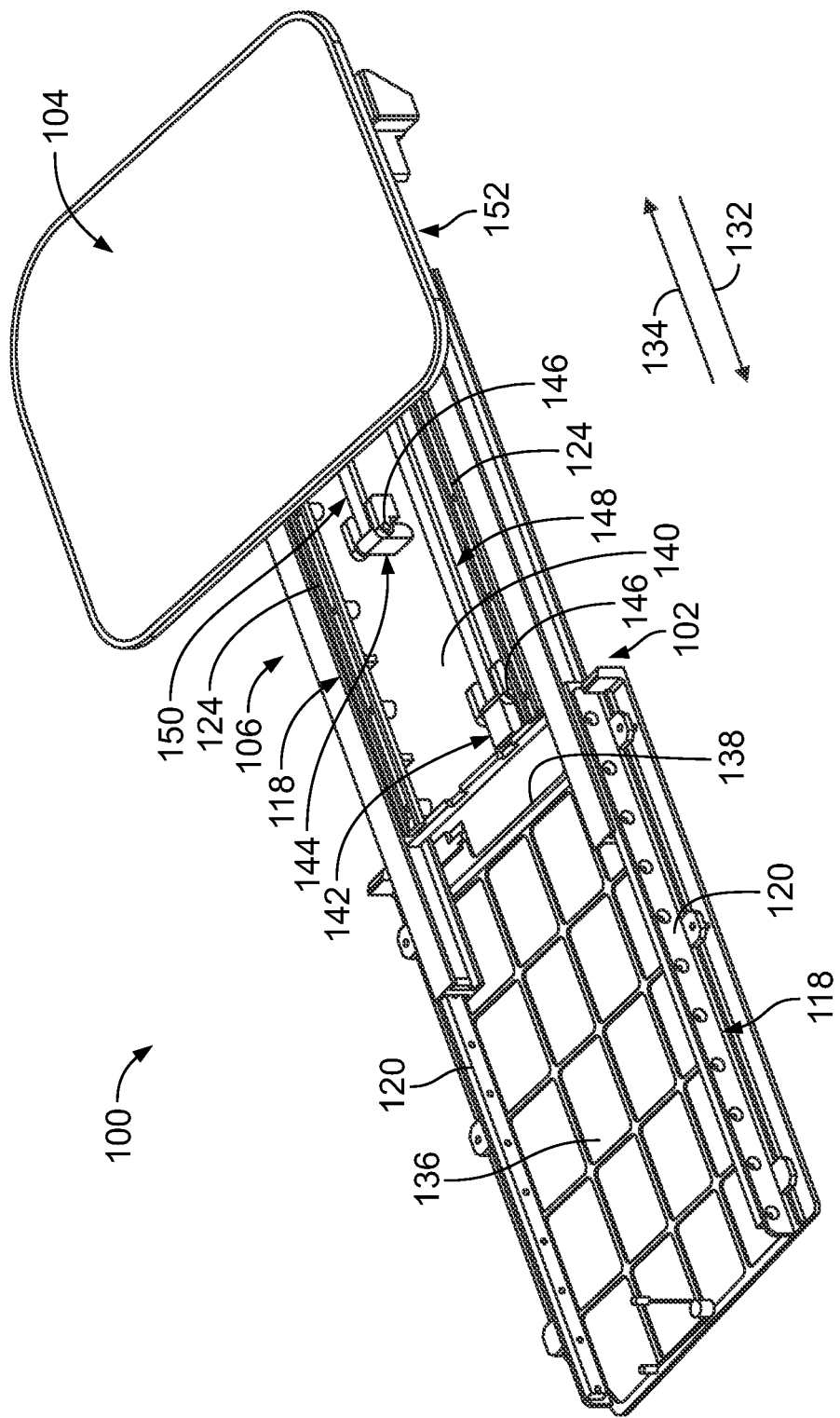
FIG. 6 is a perspective view of the slide-out tray table shown in FIGS. 1 and 2 illustrating an interlock assembly according to an implementation.

For example, in some implementations, the base 102 of the tray table 100 includes a telescopic rail system 118 having rail sets 120, 122, and 124 (the rail sets 122 and 124 are best seen in FIG. 6). The rail sets 120, 122, and 124 are slidably interconnected with each other such that the rail sets 120, 122, and 124 are configured to slide relative to each other along the longitudinal axis 116 to thereby expand and contract the base 102 along the longitudinal axis 116. FIGS. 5B, 5C, and 5D illustrate optional covers 126 and 128 that cover the rail sets 122 and 124. The base 102 is not limited to the exemplary rail system 118 shown and described herein. Rather, in addition or alternatively to the rail system 118, the base 102 may include any other structure, system, mechanism, device, and/or the like that enables the base 102 to expand and contract along the longitudinal axis 116 and thereby move the tray table 100 between the stowed and extended positions. Although shown as having three rail sets 120, 122, and 124, the rail system 118 may include any other number of rail sets. Moreover, although each rail set 120, 122, and 124 includes two opposing rails in the exemplary implementation, in other implementations one or more rail sets includes another number of rails (e.g., a single rail, three rails, etc.).

The table leaf 104 of the tray table 100 is selectively rotatably relative to the base 102 between a stowed position of the table leaf 104 and a deployed position of the table leaf 104. As shown in FIG. 5A, the table leaf 104 is in the stowed position thereof when the tray table 100 is in the stowed position thereof. To further deploy the tray table 100 from the extended position of the tray table 100 shown in FIG. 5B to the deployed position of the tray table 100 shown in FIG. 5C, the table leaf 104 is rotated relative to the base 102 (e.g., in the direction of the arrow 130, etc.) from the stowed position thereof shown in FIG. 5B into the deployed position of the table leaf 104 shown in FIG. 5C. In some implementations, the tray table 100 is configured such that the table leaf 104 extends over the lap of an occupant of the corresponding seat when the tray table 100 is in the deployed position thereof.

From the deployed position shown in FIG. 5C, the tray table 100 can be moved to an egress position of the tray table 100, which is shown in FIG. 5D. Specifically, in the egress position of the tray table 100, the base 102 is partially collapsed (e.g., retracted partially inwardly, etc.) along the longitudinal axis 116 such that the table leaf 104 is moved along the longitudinal axis 116 in the direction of the arrow 132 relative to the extended position of the tray table 100 shown in FIGS. 5B and 5C. As shown in FIG. 5D, in the egress position of the tray table 100, the table leaf 104 remains in the deployed position thereof. The egress position of the tray table 100, for example; enables an occupant of the corresponding seat to stand up and/or leave the seat; provides the occupant with greater freedom of movement; provides the occupant with more arm and/or leg space; etc.

Figure 4A:
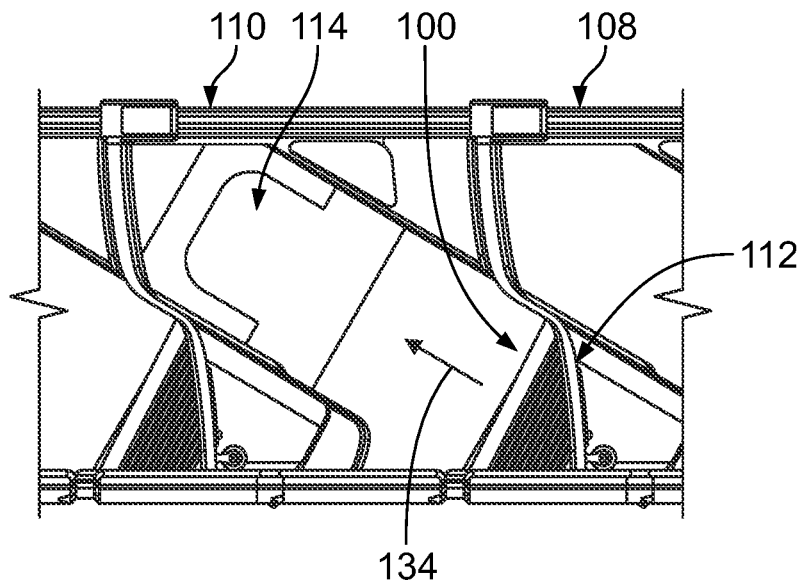
FIGS. 4A-4E are a series of plan views illustrating operation of the slide-out tray table shown in FIGS. 1 and 2 according to an implementation.
Figure 4B:
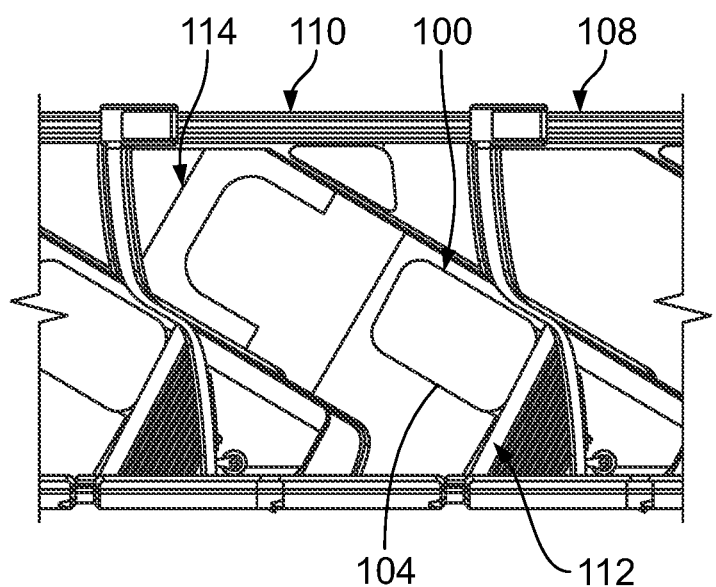
Figure 4C:
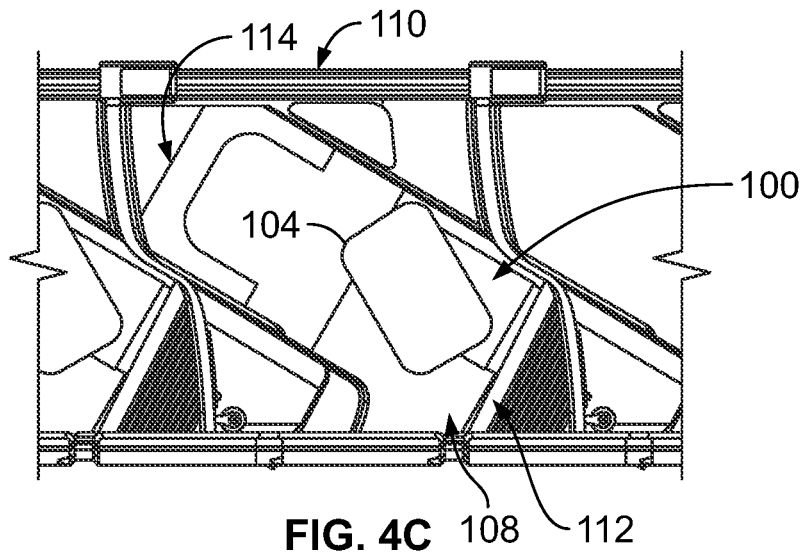
Figure 4D:
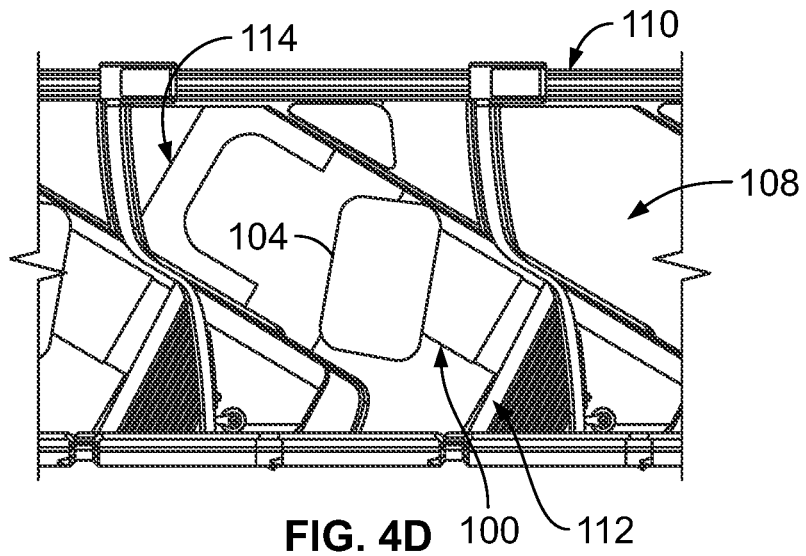
Figure 4E:
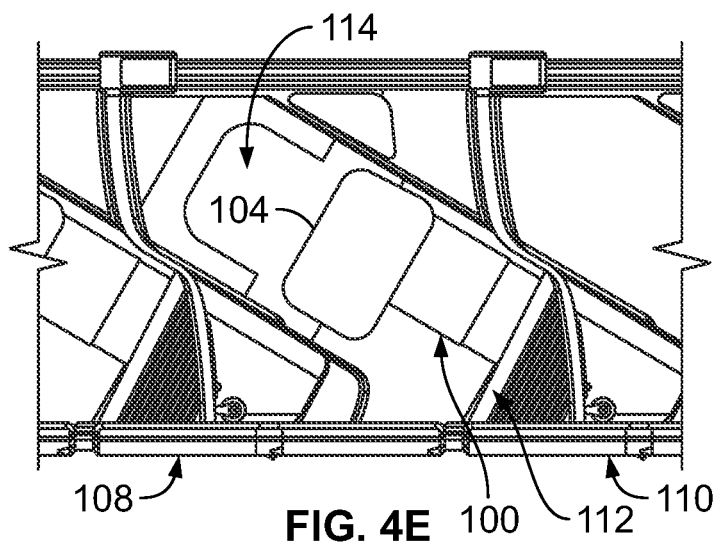

In operation, and referring again to FIGS. 4A-4E, the tray table 100 is deployed for use by pulling on the tray table 100 in the direction of the arrow 134 to thereby move the tray table 100 from the stowed position of the tray table 100 shown in FIG. 4A to the extended position of the tray table 100 shown in FIG. 4B. The table leaf 104 of the tray table 100 is then rotated from the stowed position of the table leaf 104 shown in FIG. 4B into the deployed position of the table leaf 104 shown in FIG. 4E. FIGS. 4C and 4D illustrate the table leaf 104 in intermediate positions between the stowed position shown in FIG. 4B and the deployed position shown in FIG. 4E. As shown in FIGS. 4A-4E, in the exemplary implementation the table leaf 104 is rotated 90° from the stowed position shown in FIG. 4B into the deployed position shown in FIG. 4E. Other angular differences (e.g., 180°, etc.) between the stowed and deployed positions of the table leaf 104 are contemplated as being within the scope of the present disclosure.

Figure 7:
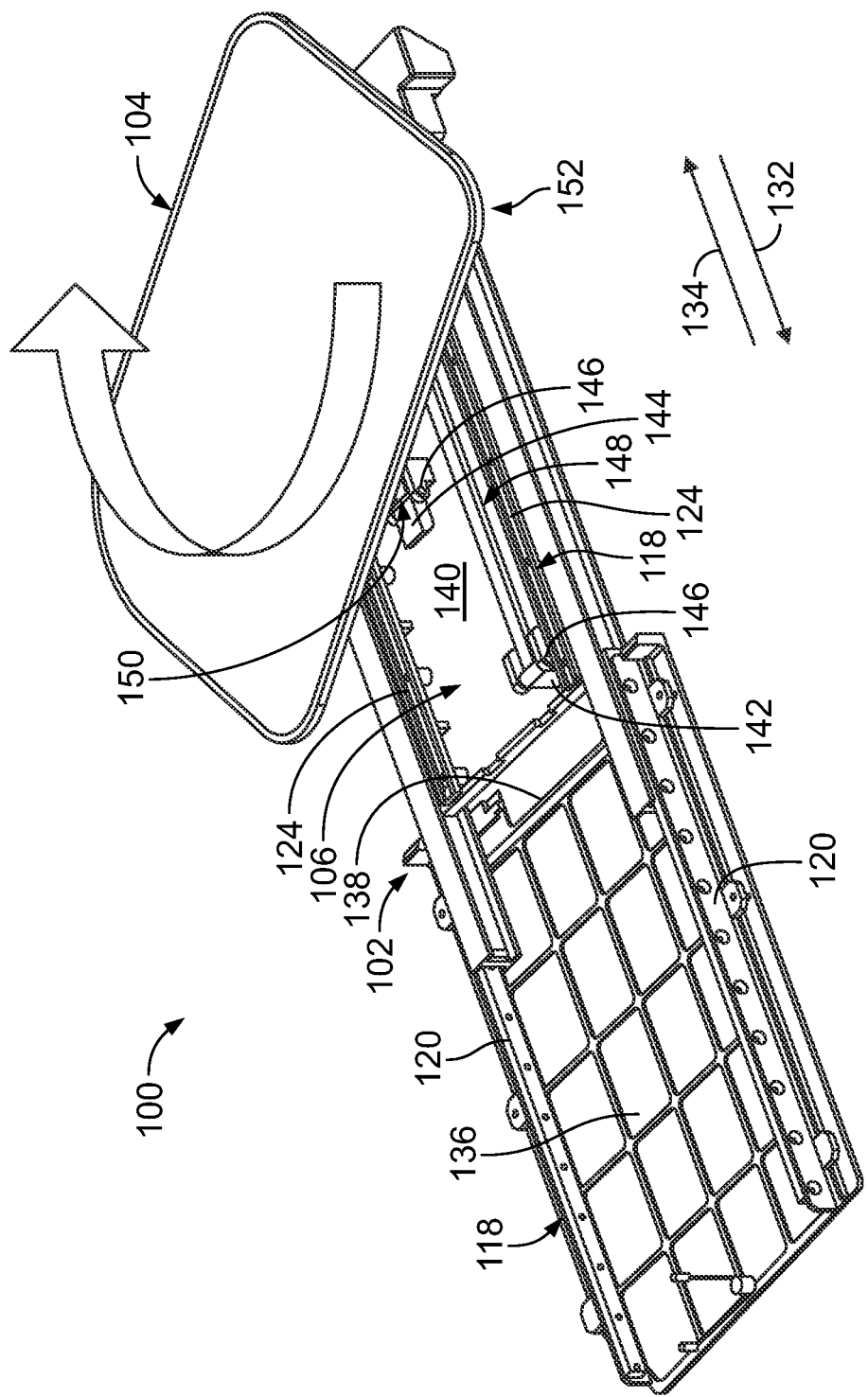
FIG. 7 is another perspective view of the slide-out tray table shown in FIGS. 1 and 2 illustrating the interlock assembly shown in FIG. 6 according to an implementation.

Referring now to FIGS. 6 and 7, the interlock assembly 106 of the tray table will now be described. The covers 126 and 128 (shown in FIG. 5) of the base 102 have been removed from FIGS. 6 and 7 to better illustrate the interlock assembly 106. The base 102 of the tray table 100 includes a base plate 136 into which the rail set 120 of the rail system 118 is incorporated (e.g., the rail set 120 is mounted to the base plate 136 as shown in the exemplary implementation of FIGS. 6 and 7, the rail set 120 is integrally formed as a single unitary structure with the base plate 136, etc.). The base plate 136 includes a stop 138. The base 102 of the tray table 100 also includes a base plate 140 into which the rail set 124 of the rail system 118 is incorporated (e.g., the rail set 124 is mounted to the base plate 140 as shown in the exemplary implementation of FIGS. 6 and 7; the rail set 124 is integrally formed as a single unitary structure with the base plate 140, for example as shown in the exemplary implementation of the slide-out tray table 200 of FIG. 16; etc.).

The interlock assembly 106 includes a first interlock 142 and a second interlock 144. Each interlock 142 and 144 is moveable between a locked position and an unlocked position. In some implementations, the interlock 142 and/or the interlock 144 is configured to provide an audible and/or tactile indication (e.g., a snap indication, etc.) that the interlock 142 and/or 144 has moved into the locked position and/or the unlocked position thereof. FIG. 6 illustrates the first interlock 142 in the unlocked position and the second interlock 144 in the locked position, while FIG. 7 illustrates the first interlock 142 in the locked position and the second interlock 144 in the unlocked position. In some implementations, the base plate 140 of the base 102 includes one or more openings (e.g., the openings 186 and 188 shown in FIG. 13, etc.) to accommodate movement of the interlocks 142 and/or 144 from the unlocked position to the locked position thereof. For example, and referring now to FIG. 13, the base plate 140 may include one or more openings 186 into or through which the first interlock 142 moves as the first interlock 142 moves from the unlocked position to the locked position thereof; and/or the base plate 140 may include one or more openings 188 into or through which the second interlock 144 moves as the second interlock 144 moves from the unlocked position to the locked position thereof.

In the exemplary implementation, each of the interlocks 142 and 144 is configured to rotate (e.g., pivot, etc.) between the locked and unlocked positions. For example, the interlocks 142 and 144 are shown in the exemplary implementation as being hingedly mounted to the base plate 140 at a pivot point 146 for rotation about the pivot point between the locked and unlocked positions. In other implementations, the first interlock 142 and/or the second interlock 144 moves with linear motion (e.g., up and down as viewed in FIGS. 6 and 7, etc.) between the locked and unlocked positions thereof in addition or alternatively to the rotational movement shown herein. Although shown herein as having a paddle structure, the first interlock 142 and/or the second interlock 144 may additionally or alternatively include any other structure (e.g., a pin structure, etc.) that enables the interlock 142 and/or 144 to function as described and/or illustrated herein.

Movement of the interlocks 142 and 144 between the locked and unlocked positions thereof is driven by rotation of the table leaf 104 of the tray table 100. For example, the exemplary implementation of the interlock assembly 106 shown in FIGS. 6 and 7 includes linkage 148 that is operatively connected between the first interlock 142 and the table leaf 104 such that the linkage 148 translates rotation of the table leaf 104 into linear motion that moves (e.g., rotates, etc.) the first interlock 142 between the locked and unlocked positions thereof. Similarly, the exemplary implementation of the interlock assembly 106 shown in FIGS. 6 and 7 includes linkage 150 that is operatively connected between the second interlock 144 and the table leaf 104 such that the linkage 150 translates rotation of the table leaf 104 into linear motion that moves (e.g., rotates, etc.) the second interlock 144 between the locked and unlocked positions thereof.

Figure 8:
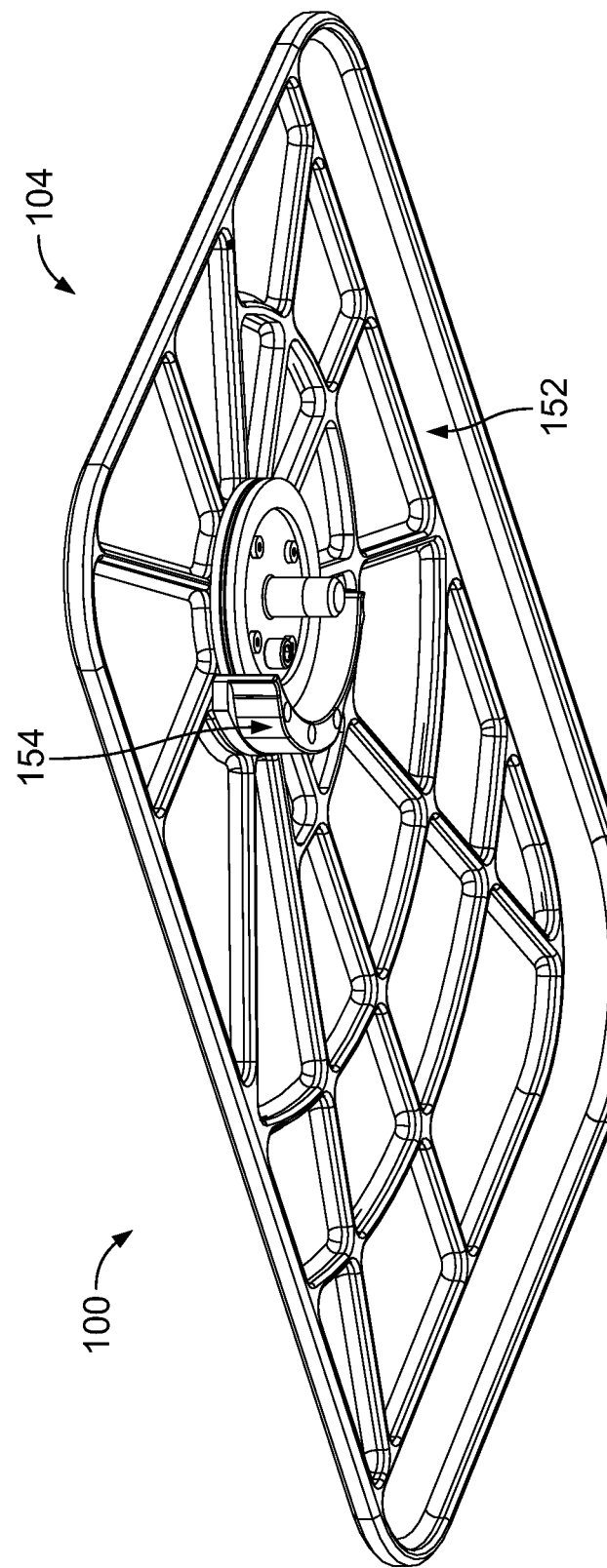
FIG. 8 is a perspective view of a table leaf of the slide-out tray table shown in FIGS. 1 and 2 illustrating a cam of the table leaf according to an implementation.

In the exemplary implementation, an underside 152 of the table leaf 104 includes one or more cams 154 (not visible in FIGS. 6 and 7) that enable rotation of the table leaf 104 to move the interlocks 142 and 144 between the locked and unlocked positions thereof. FIG. 8 illustrates an exemplary implementation of a cam 154 used to drive movement of the interlocks 142 and 144 (not shown in FIG. 8) between the locked and unlocked positions thereof. Referring now to FIGS. 6-8, the linkage 148 (not shown in FIG. 8) is operatively connected between the first interlock 142 and the cam 154 of the table leaf 104 such that the linkage 148 translates rotation of the table leaf 104 into linear motion of the linkage 148 (e.g., in the directions 132 and 134 along the longitudinal axis 116, etc.) to thereby move (e.g., rotate, etc.) the first interlock 142 between the locked and unlocked positions thereof. For example, the cam 154 includes a profile that engages an end portion (not visible in FIGS. 6 and 7) of the linkage 148. A segment of the profile of the cam 154 has a geometry that is selected such that rotation of the table leaf 104 through a predetermined angular orientation pushes the linkage 148 in the direction of the arrow 132 to thereby move the first interlock 142 from the unlocked position shown in FIG. 6 to the locked position shown in FIG. 7. Similarly, and for example, another segment of the profile of the cam 154 has a geometry that is selected such that rotation of the table leaf 104 through a predetermined angular orientation pulls the linkage 148 in the direction 134 to thereby move the first interlock 142 from the locked position shown in FIG. 7 to the unlocked position shown in FIG. 6.

Similar to the linkage 148, the linkage 150 is operatively connected between the second interlock 144 and the cam 154 such that the linkage 150 translates rotation of the table leaf 104 into linear motion of the linkage 150 (e.g., in the directions 132 and 134 along the longitudinal axis 116, etc.) to thereby move (e.g., rotate, etc.) the second interlock 144 between the locked and unlocked positions thereof. For example, a segment of the profile of the cam 154 has a geometry that is selected such that rotation of the table leaf 104 through a predetermined angular orientation pushes the linkage 150 in the direction 132 to thereby move the second interlock 144 from the unlocked position shown in FIG. 7 to the locked position shown in FIG. 6. Similarly, and for example, another segment of the profile of the cam 154 has a geometry that is selected such that rotation of the table leaf 104 through a predetermined angular orientation pulls the linkage 150 in the direction 134 to thereby move the second interlock 144 from the locked position shown in FIG. 6 to the unlocked position shown in FIG. 7.

Although the exemplary implementation of the interlock assembly 106 includes a single cam 154 for driving movement of both the interlocks 142 and 144 between the locked and unlocked positions thereof, the table leaf 104 may include any number of cams for driving movement of the interlocks 142 and 144. For example, in some other implementations, the table leaf 104 includes a first cam that is dedicated for driving movement of the first interlock 142 between the locked and unlocked positions thereof, and a second cam dedicated for driving movement of the second interlock 144 between the locked and unlocked positions thereof. Moreover, the configuration, arrangement, operation, and/or the like of the cam 154 and the linkages 148 and 150 shown and described herein is meant as exemplary only. The interlock assembly 106 may additionally or alternatively include any other structure, configuration, arrangement, components, operation, and/or the like that enables the interlock assembly to function as described and/or illustrated herein.

Figure 9:
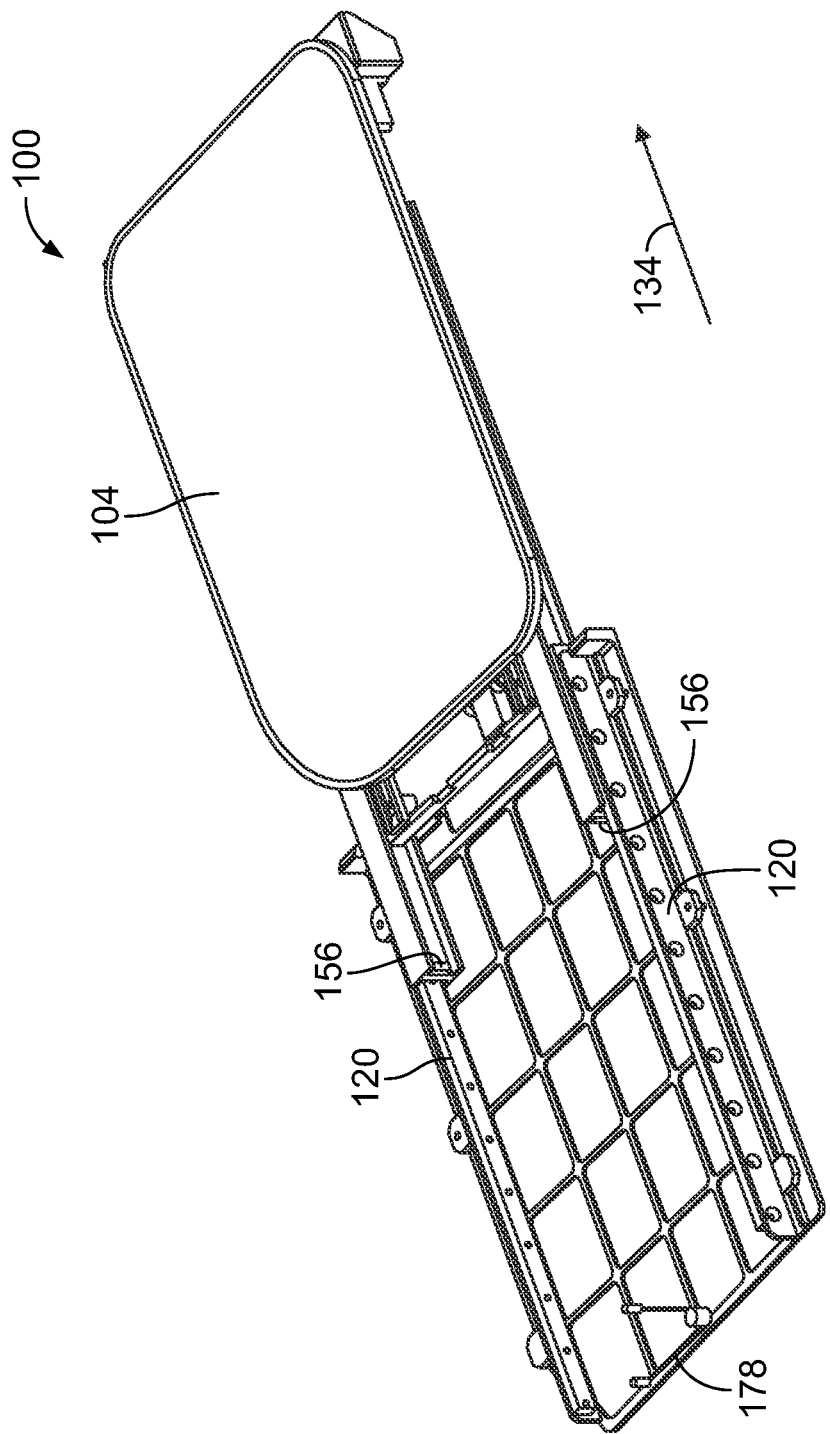
FIG. 9 is a perspective view illustrating the slide-out tray table shown in FIGS. 1 and 2 in an extended position of the slide-out tray table according to an implementation.
Figure 10:
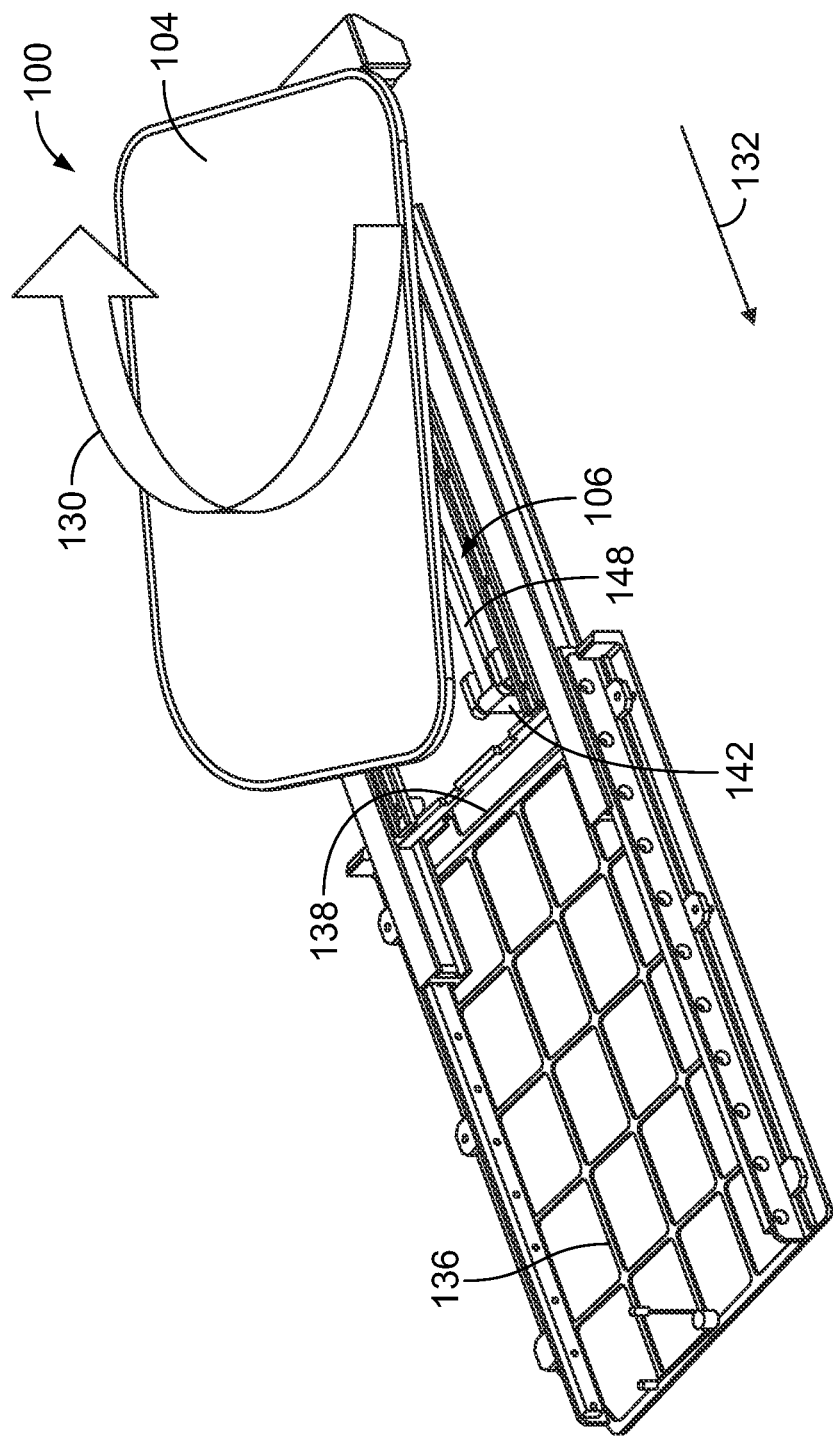
FIG. 10 is a perspective view illustrating the table leaf of the slide-out tray table shown in FIGS. 1 and 2 in an intermediate position according to an implementation.

In operation, FIG. 9 illustrates the tray table 100 having been pulled out in the direction 134 from the stowed position shown in FIG. 5A to the extended position of the tray table 100. In some implementations, further movement of the tray table 100 in the direction 134 is limited by as stop, for example a stop 156 extending at a predetermined location along the length of the rail set 120. Referring now to FIG. 10, as the table leaf 104 is rotated in the direction 130 from the stowed position of the table leaf 104 shown in FIG. 9 toward the deployed position of the table leaf 104, the profile of the cam 154 (shown in FIG. 8) causes the linkage 148 to move the first interlock 142 from the unlocked position shown in FIG. 9 to the locked position shown in FIG. 10.

Figure 11:
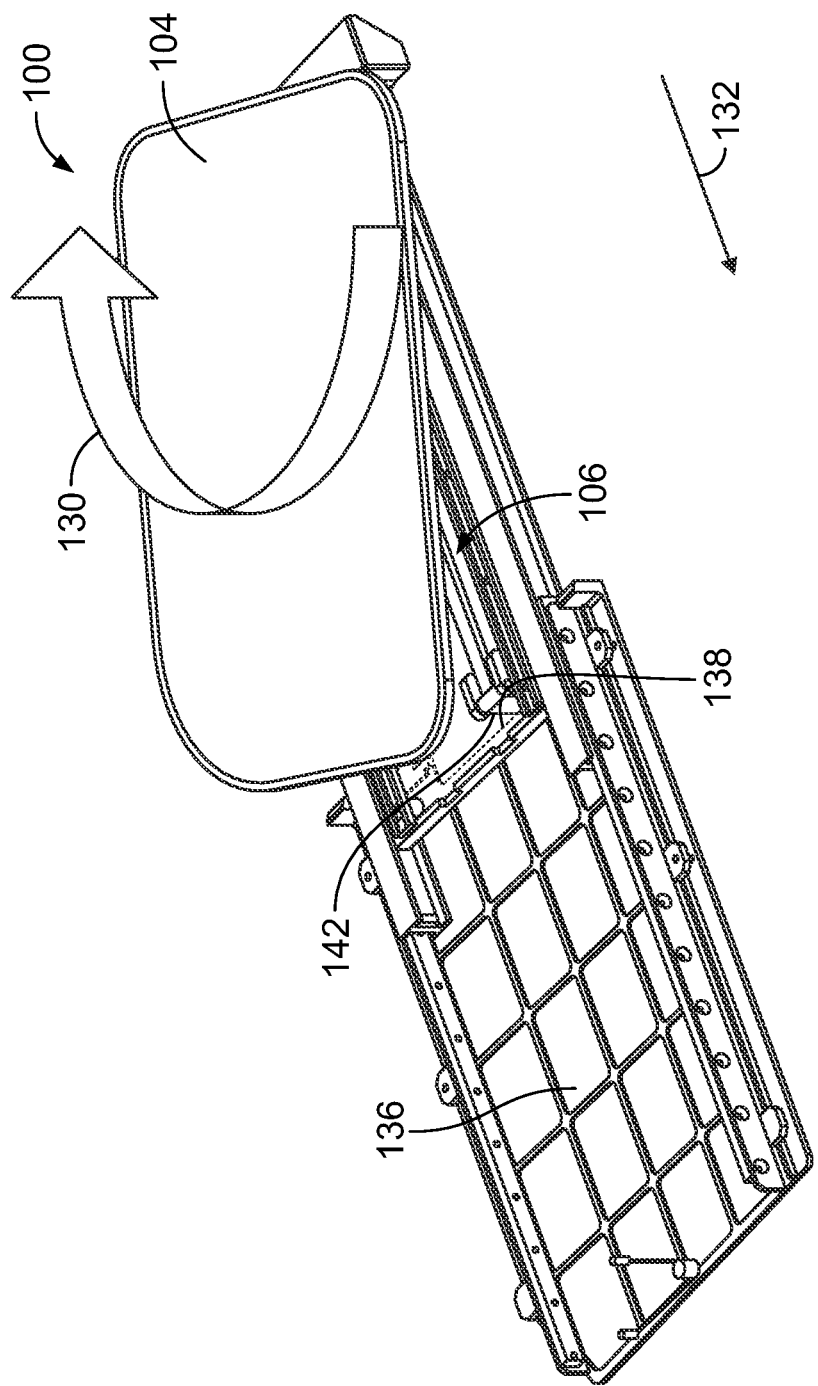
FIG. 11 is a perspective view illustrating an interlock of the interlock assembly shown in FIG. 6 engaged with a stop of the slide-out tray table according to an implementation.

As shown in FIG. 11, the locked position of the first interlock 142 is configured to engage the stop 138 of the base plate 136 to limit movement of the tray table 100 in the direction 132 from the extended position shown in FIG. 10 toward the stowed position of the tray table 100. Accordingly, the first interlock 142 limits movement of the tray table 100 toward the stowed position when the table leaf 104 is in an intermediate position between the stowed and deployed positions of the table leaf 104, for example as shown in FIG. 11. By limiting movement of the tray table 100 in the direction 132, the interlock assembly 106 prevents, or reduces the likelihood of, the table leaf 104 contacting (e.g., clashing with, etc.) adjacent structures of the aircraft in the event a user attempts to push the tray table 100 toward the stowed position of the tray table 100 when the table leaf 104 is in an intermediate position between the stowed and deployed positions of the table leaf 104. For example, the interlock assembly 106 may prevent, or reduce the likelihood of, the table leaf 104 contacting portions 158 and/or 160 of the seating structure 112 of the aircraft 110 shown in FIG. 3 in the event a user attempts to push the tray table 100 toward the stowed position of the tray table 100 when the table leaf 104 is in an intermediate position between the stowed and deployed positions of the table leaf 104. The interlock assembly 106 therefore facilitates preventing damage to the tray table 100 and/or structures of the aircraft that are adjacent the tray table 100.

The first interlock 142 may be moved from unlocked position to the locked position by any amount rotation of the table leaf 104 away from the stowed position of the table leaf 104 toward the deployed position of the table leaf 104. For example, in some implementations, the geometry of the profile of the cam 154 (shown in FIG. 8) is selected such that the first interlock 142 is moved from the unlocked position to the locked position by rotation of the table leaf 104 in the direction 130 of less than approximately 45° away from the stowed position of the table leaf 104. In other examples, the geometry of the profile of the cam 154 is selected such that the first interlock 142 is moved from the unlocked position to the locked position by rotation of the table leaf 104 in the direction 130 of less than approximately 30° away from the stowed position of the table leaf 104, less than approximately 20° away from the stowed position of the table leaf 104, at approximately 15° away from the stowed position of the table leaf 104 as shown in FIG. 10, and/or the like. In some implementations, the amount of rotation of the table leaf 104 away from the stowed position thereof necessary to move the first interlock 142 from the unlocked position to the locked position thereof is selected based on the relative geometry of structures of the aircraft that are adjacent the tray table 100 (e.g., the first interlock 142 is configured to be moved to the locked position before the table leaf 104 moves to a position wherein the table leaf 104 will contact one or more adjacent structures of the aircraft, etc.).

Figure 12:
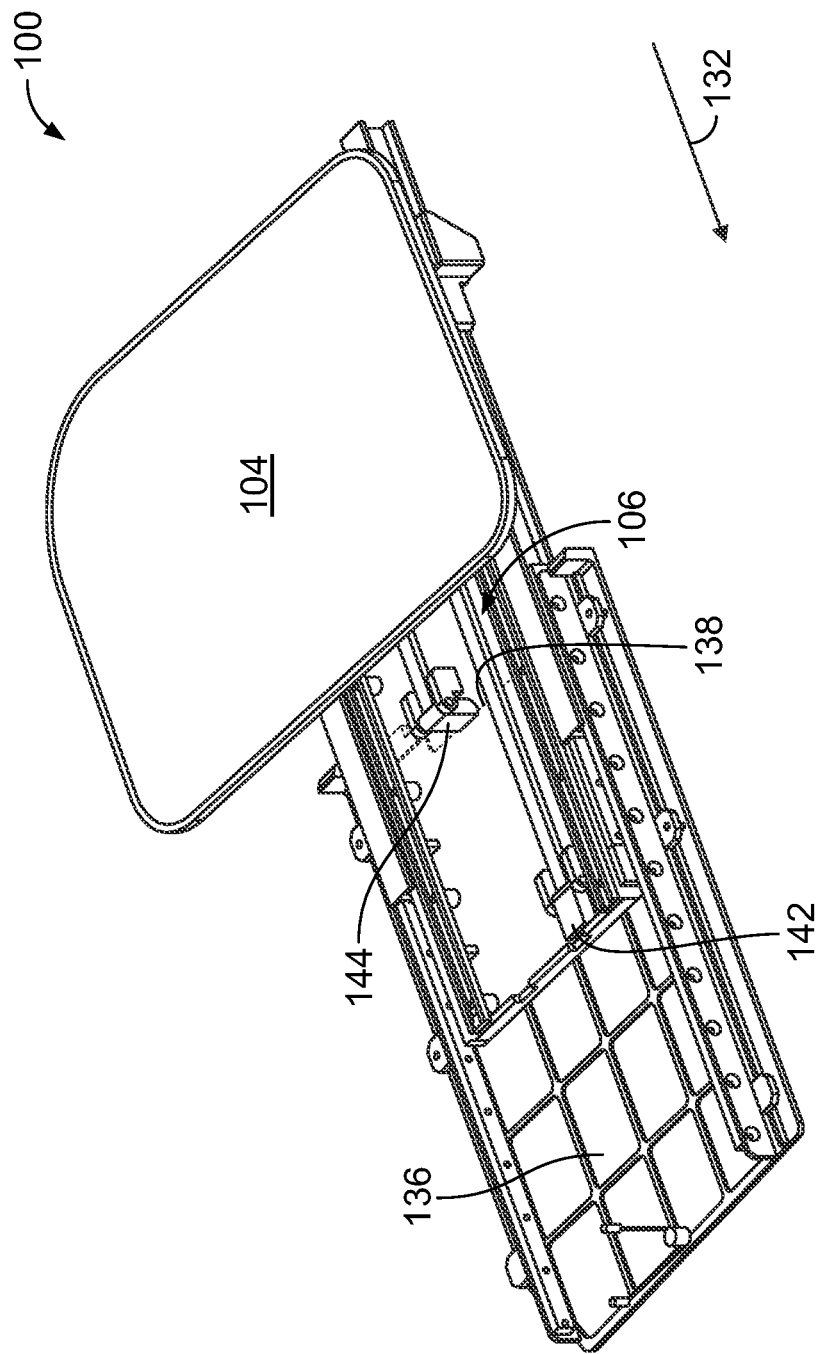
FIG. 12 is a perspective view illustrating the interlock assembly shown in FIG. 6 when the slide-out tray table is in an egress position according to an implementation.

Referring again to FIGS. 6 and 7, as the table leaf 104 is rotated further in the direction 130 from the intermediate position shown in FIG. 10 into the deployed position of the table leaf 104 shown in FIG. 6, the profile of the cam 154 (shown in FIG. 8) causes the linkage 150 of the second interlock 144 to move the second interlock 144 from the unlocked position shown in FIG. 7 to the locked position shown in FIG. 6. The profile of the cam 154 is selected such that rotation of the table leaf 104 from the intermediate position shown in FIG. 10 into the deployed position of the table leaf 104 shown in FIG. 6 also causes the linkage 148 of the first interlock 142 to move the first interlock 142 from the locked position shown in FIG. 7 to the unlocked position shown in FIG. 6. As shown in FIG. 12, the unlocked position of the first interlock 142 enables the tray table 100 to be pushed in the direction 132 into the egress position of the tray table 100.

In the egress position of the tray table 100 shown in FIG. 12, the locked position of the second interlock 144 is configured to engage the stop 138 of the base plate 136 to limit movement of the tray table 100 in the direction 132 (i.e., further toward the stowed position of the tray table 100) past the egress position of the tray table 100. Accordingly, the second interlock 144 limits movement of the tray table 100 in the direction 132 past the egress position of the tray table 100 when the table leaf 104 is in the deployed position of the table leaf 104. By limiting movement of the tray table 100 in the direction 132, the interlock assembly 106 prevents, or reduces the likelihood of, the table leaf 104 contacting (e.g., clashing with, etc.) adjacent structures of the aircraft in the event a user attempts to push the tray table 100 in the direction 132 past the egress position when the table leaf 104 is in the deployed position of the table leaf 104. For example, the interlock assembly 106 may prevent, or reduce the likelihood of, the table leaf 104 contacting the portions 158 and/or 160 of the seating structure 112 of the aircraft 110 shown in FIG. 3 in the event a user attempts to push the tray table 100 past the egress position when the table leaf 104 is in the deployed positions of the table leaf 104. The interlock assembly 106 therefore facilitates preventing damage to the tray table 100 and/or structures of the aircraft that are adjacent the tray table 100.

As also shown in FIG. 12, in the egress position of the tray table 100, the unlocked position of the first interlock 142 is configured to engage the base plate 136 of the base 102 to limit rotation of the table leaf 104 from the deployed position of the table leaf 104 toward the stowed position of the table leaf 104. In other words, the base plate 136 blocks the first interlock 142 from moving to the locked position and thereby prevents the table leaf 104 from being rotated from the deployed position of the table leaf 104 toward the stowed position of the table leaf 104 when the tray table 100 is in the egress position. By limiting rotation of the table leaf 104 toward the stowed position of the table leaf 104, the interlock assembly 106 prevents, or reduces the likelihood of, the table leaf 104 contacting (e.g., clashing with, etc.) adjacent structures of the aircraft in the event a user attempts to rotate the table leaf 104 toward the stowed position of the table leaf 104 when the tray table 100 is in the egress position. For example, the interlock assembly 106 may prevent, or reduce the likelihood of, the table leaf 104 contacting the portions 158 and/or 160 of the seating structure 112 of the aircraft 110 shown in FIG. 3 in the event a user attempts to rotate the table leaf 104 toward the stowed position of the table leaf 104 when the tray table 100 is in the egress position. The interlock assembly 106 therefore facilitates preventing damage to the tray table 100 and/or structures of the aircraft that are adjacent the tray table 100.

From the deployed position of the tray table 100 shown in FIG. 6, the tray table 100 may be moved into the stowed position of the tray table 100 by first rotating the table leaf 104 from the deployed position of the table leaf 104 shown in FIG. 6 into the stowed position of the table leaf 104 shown in FIG. 9. As the table leaf 104 is rotated toward the stowed position of the table leaf 104, the profile of the cam 154 (shown in FIG. 8) of the table leaf 104 first moves the first interlock 142 from the unlocked position to the locked position thereof. As the table leaf 104 is further rotated into the stowed position of the table leaf 104, the profile of the cam 154 then moves the first interlock 142 back to the unlocked position shown in FIG. 9. Rotation of the table leaf 104 from the deployed position of the table leaf 104 shown in FIG. 6 into the stowed position of the table leaf 104 shown in FIG. 9 also moves the second interlock 144 from the locked position shown in FIG. 6 to the unlocked position of the second interlock 144. From the extended position of the tray table 100 shown in FIG. 9, the tray table 100 can be moved into the stowed position of the tray table 100 by sliding the table leaf 104 in the direction 132 to thereby collapse the base 102 inwardly into the stowed position of the tray table 100 shown in FIG. 5A.

Figure 13:
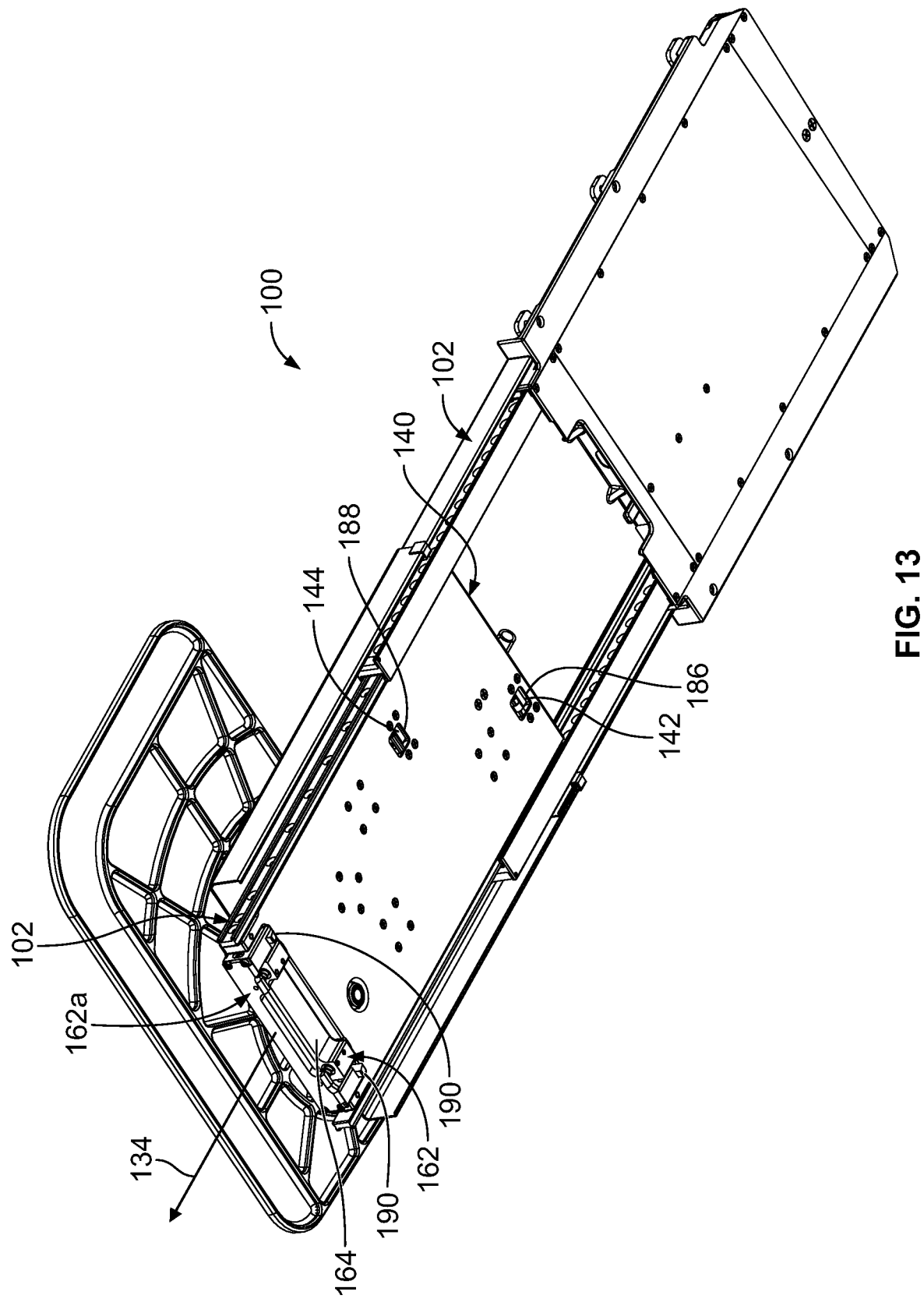
FIG. 13 is a perspective view of the slide-out tray table shown in FIGS. 1 and 2 illustrating a latch of the slide-out tray table according to an implementation.
Figure 14:
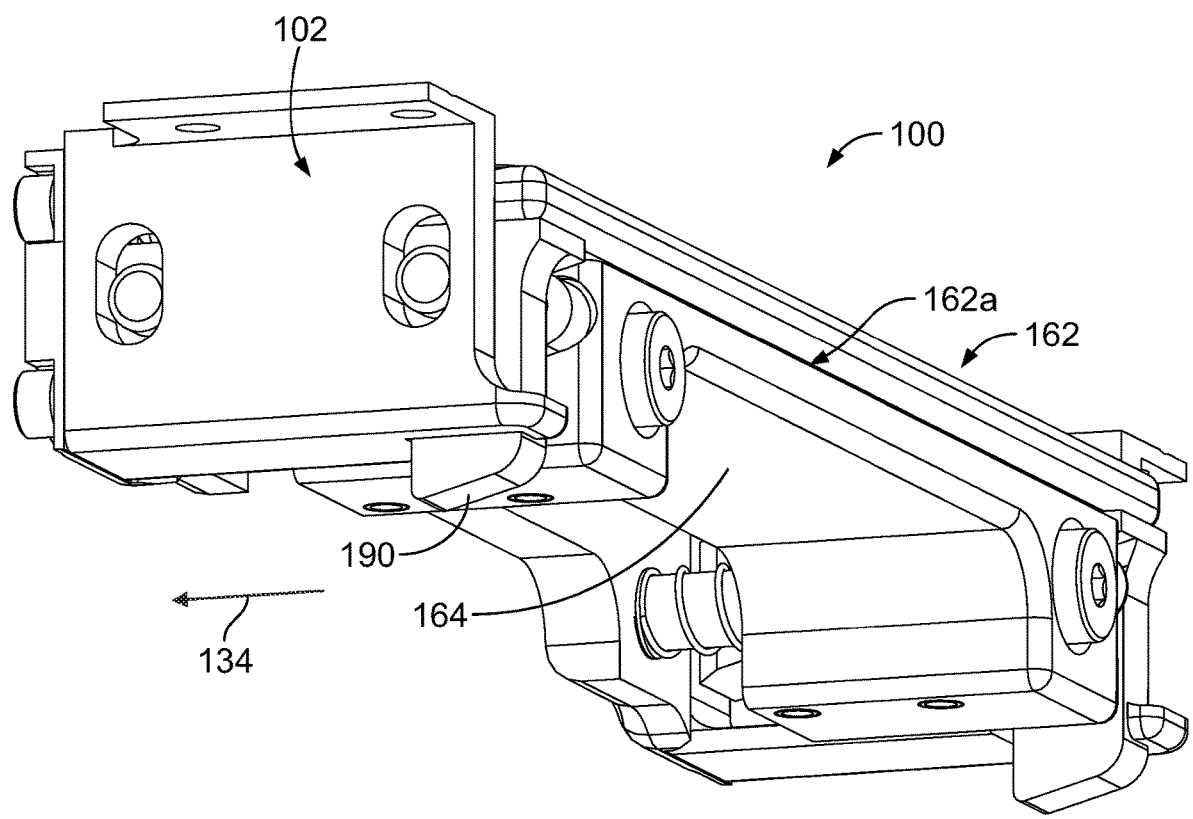
FIG. 14 is a perspective view illustrating the latch shown in FIG. 13 according to an implementation.
Figure 15:
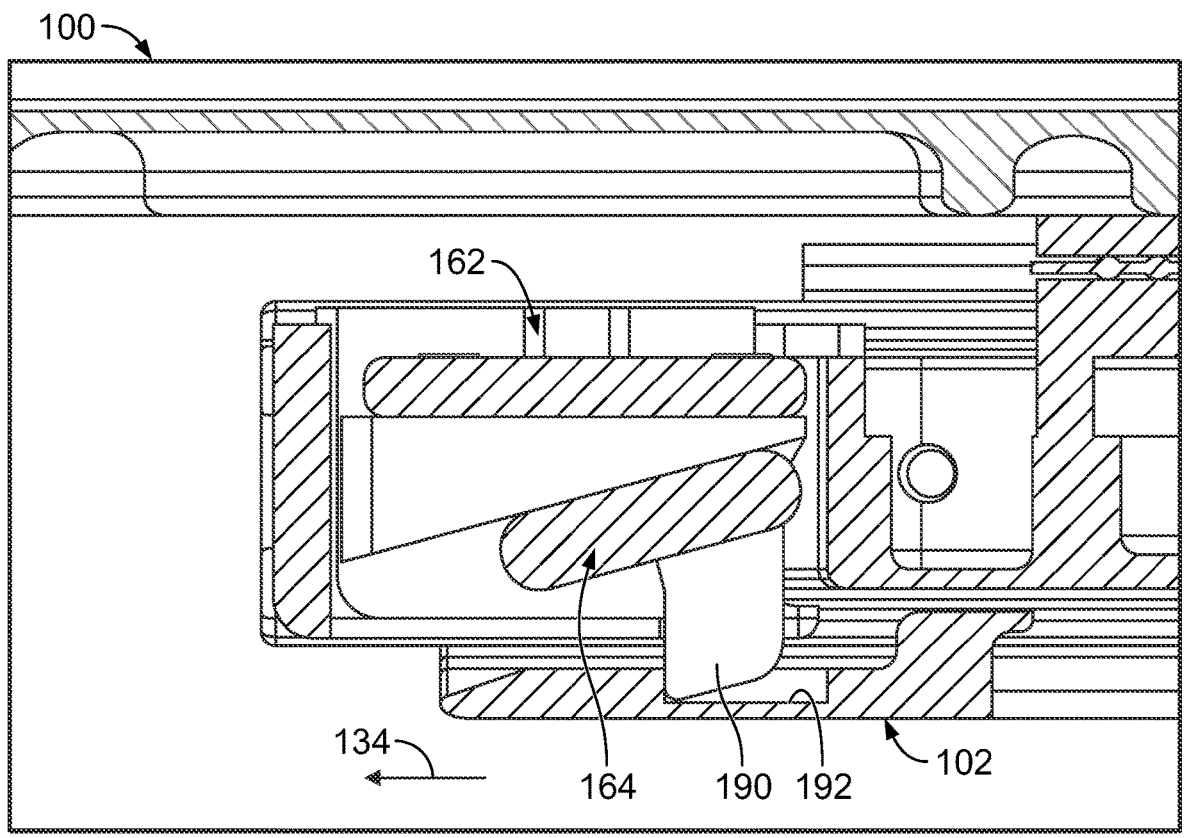
FIG. 15 is a cross-sectional view illustrating the latch shown in FIGS. 13 and 14 according to an implementation.

Referring now to FIGS. 2, 13, and 14, some implementations of the slide-out tray table 100 include a latch 162 configured to releasably hold the tray table 100 in the stowed position of the tray table 100. In the exemplary implementation, the latch 162 is integrated into the tray table 100 such that the latch 162 does not require any integration, alignment, adjustment, and/or the like with the seating structure (e.g., the seating structure 112 of the aircraft 110 shown in FIG. 3, etc.) of the aircraft that holds the tray table 100 (e.g., the structure of the aircraft within which the tray table 100 is mounted and/or installed, etc.). Moreover, in the exemplary implementation the latch 162 is configured as a cartridge 162a that is configured to be interchangeably mounted to the base 102 of the tray table 100, for example using a snap fit, an interference fit, one or more threaded fasteners, a clip, etc. In the exemplary implementation, the latch cartridge 162a is mounted to the base 102 of the tray table 100 using four threaded fasteners (not shown, e.g., the threaded fasteners 390 provided for mounting the latch cartridge 362a to the base 302 of the tray table 300 shown in FIG. 17, etc.). The cartridge 162a enables the latch 162 to be relatively quickly and easily removed from the tray table 100, for example for maintenance, repair, replacement, and/or the like. Configuring the latch 162 as a cartridge 162a may therefore reduce labor and thus maintenance costs of the aircraft.

Referring now to FIGS. 2 and 13-15, the latch 162 includes an actuator 164 (not visible in FIG. 2) configured actuate the latch 162 to release the tray table 100 from the stowed position of the tray table 100. Specifically, the latch 162 includes a latching element 190 (not visible in FIG. 2) that is configured to releasably engage latching structure 192 (not visible in FIGS. 2, 13, and 14) of the base 102. The actuator 164 is operatively connected (e.g., directly as shown in the exemplary implementation of FIG. 15, indirectly through intervening linkage, etc.) to the latching element 190 such that movement of the actuator 164 in the direction 134 relative to the body of the latch 162 disengages the latching element 190 from the latching structure 192 of the base 102 to unlatch the latch 162 and thereby release the tray table 100 from the stowed position thereof. The tray table 100 includes a handle 166 (not shown in FIGS. 13-15) for the user to grasp to pull the tray table 100 out of the stowed position of the tray table 100. In the exemplary implementation, the handle 166 of the tray table 100 is mounted to the actuator 164. Accordingly, the act of grasping and using the handle 166 to pull the tray table 100 in the direction 134 away from the stowed position of the tray table 100 and toward the extended position of the tray table 100 also moves the actuator 164 of the latch 162 in the direction 134 such that the latch element 190 of the latch 162 disengages from the latching structure 192 of the base 102. Accordingly, the exemplary implementation of the latch 162 is configured to release the tray table 100 from the stowed position when the tray table 100 is pulled in the direction 134 away from the stowed position and toward the extended position of the tray table 100 using the handle 166. The exemplary implementation of the latch 162 thus enables the user to pull the tray table 100 away from the stowed position toward the extended position with a single motion, which may be more intuitive and therefore may improve user experience.

Referring now solely to FIG. 2, the tray table 100 optionally includes a face plate 168, which in the exemplary implementation is mounted in front of the latch 162. In the exemplary implementation, the face plate 168 includes an opening 170 into which the handle 166 of the tray table 100 extends. Optionally, the handle 166 is recessed within the opening in the direction 132, for example to provide an indication that indicates the location of the handle of the tray table 100. Other indications may additionally or alternatively be provided (e.g., a label, an arrow and/or other symbol, etc.). In some implementations, the face plate 168 defined by a single unitary structure, while in other implementations the face plate 168 is defined by two or more interconnected segments. The face plate 168 may be interchangeably mounted to the base 102 (e.g., using a snap fit, an interference fit, one or more threaded fasteners, a clip, etc.). The interchangeable mounting of the face plate 168 enables the face plate 168 to be relatively quickly and easily removed from the tray table 100, for example for maintenance, repair, replacement, and/or the like. The interchangeable mounting of the face plate 168 may therefore reduce labor and thus maintenance costs of the aircraft. Moreover, the interchangeable mounting of the face plate 168 enables the face plate 168 to be more easily customized for different customers.

Figure 16:
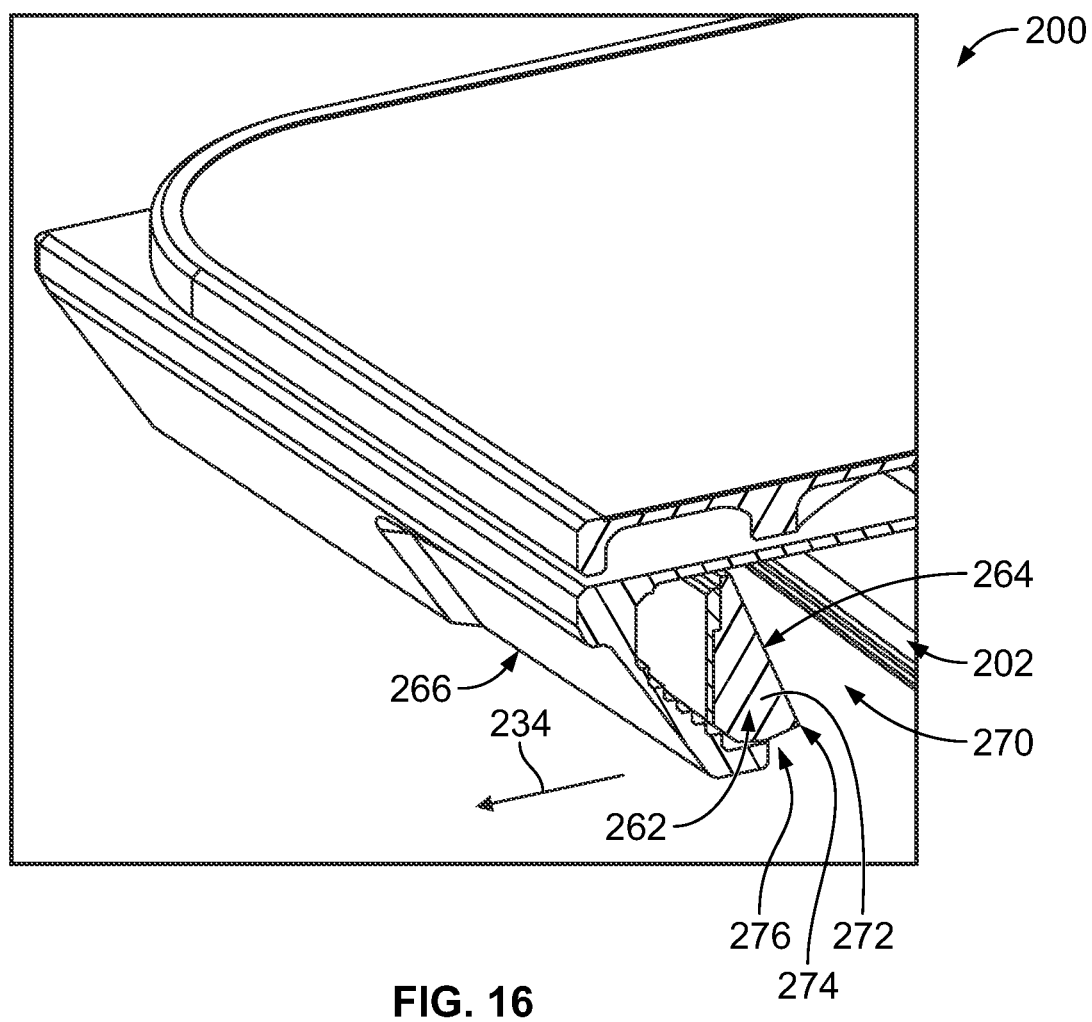
FIG. 16 is a cut away perspective view of a slide-out tray table illustrating a latch according to another implementation.

Referring now to FIG. 16, a slide-out tray table 200 having another implementation of a latch 262 is shown. The latch 262 includes an actuator 264 that includes a hinged lever 272 configured actuate the latch 262 to release the tray table 200 from the stowed position thereof. Specifically, the latch 262 includes a latching element (not shown) that is configured to releasably engage latching structure (not shown) of a base 202 of the tray table 200. The lever 272 is operatively connected (e.g., directly, indirectly through intervening linkage, etc.) to the latching element such that movement of an actuation point 274 of the lever 272 in the direction of the arrow 234 disengages the latching element from the latching structure of the base 202 to unlatch the latch 262 and thereby release the tray table 200 from the stowed position thereof.

In the exemplary implementation, the actuation point 274 of the lever 272 is positioned within an opening 270 (e.g., near a bottom 276 of the opening 270 as is shown in FIG. 16, etc.) such that the act of grasping and using a handle 266 of the tray table 200 to pull the tray table 200 in the direction 234 away from the stowed position of the tray table 200 and toward the extended position of the tray table 200 also moves the actuation point 274 of the lever 272 in the direction 234 such that the latching element of the latch 262 disengages from the latching structure of the base 202. Accordingly, the exemplary implementation of the latch 262 is configured to release the tray table 200 from the stowed position when the tray table 200 is pulled in the direction 234 away from the stowed position and toward the extended position of the tray table 200 using the handle 266. The exemplary implementation of the latch 262 shown in FIG. 16 thus enables the user to pull the tray table 200 away from the stowed position toward the extended position with a single motion, which may be more intuitive and therefore may improve user experience.

Referring again to FIG. 9, the tray table 100 optionally includes a biasing mechanism 178 configured to bias the base 102 of the tray table 100 from the stowed position of the tray table 100 toward the extended position of the tray table 100. In other words, when the tray table 100 is in the stowed position thereof, the bias provided by the biasing mechanism 178 biases the base 102 in the direction 134 toward the extended position of the tray table 100. The biasing mechanism 178 may have any configuration that enables the biasing mechanism 178 to function as described and/or illustrated herein. For example, the biasing mechanism 178 is operatively connected to the base 102 (e.g., between the base plates 136 and 140, between the base plate 136 and the cover 126, etc.) such that the biasing mechanism 178 biases the base 102 in the direction 134 when the tray table 100 is in the stowed position.

The bias provided by the biasing mechanism 178 aids initial deployment (i.e., movement in the direction 134) of the tray table 100 away from the stowed position. The bias of the biasing mechanism 178 provides positive pressure against the latch 162 that may reduce or eliminate rattling of the tray table 100 (e.g., during flight, etc.) when the tray table 100 is latched in the stowed position. Moreover, bias provided by the biasing mechanism 178 may provide a visual indication that the tray table 100 is not latched in the stowed position. For example, when the latch 162 is not engaged with the latching structure of the base 102, the bias provided by the biasing mechanism pushes the tray table 100 slightly away from the stowed position in the direction 134, such that a user, flight crew, and/or other individuals can see that the tray table 100 is not latched in the stowed position.

The biasing mechanism 178 may include any structure, type of biasing mechanism, and/or the like that enables the biasing mechanism 178 to function as described and/or illustrated herein. In the exemplary implementation of the biasing mechanism 178, the biasing mechanism 178 includes a helical torsion spring. But, the biasing mechanism 178 may additionally or alternatively include any other type of spring (e.g., a coil spring, a torsion bar, a leaf spring, etc.) and/or another type of biasing mechanism.

Figure 17:
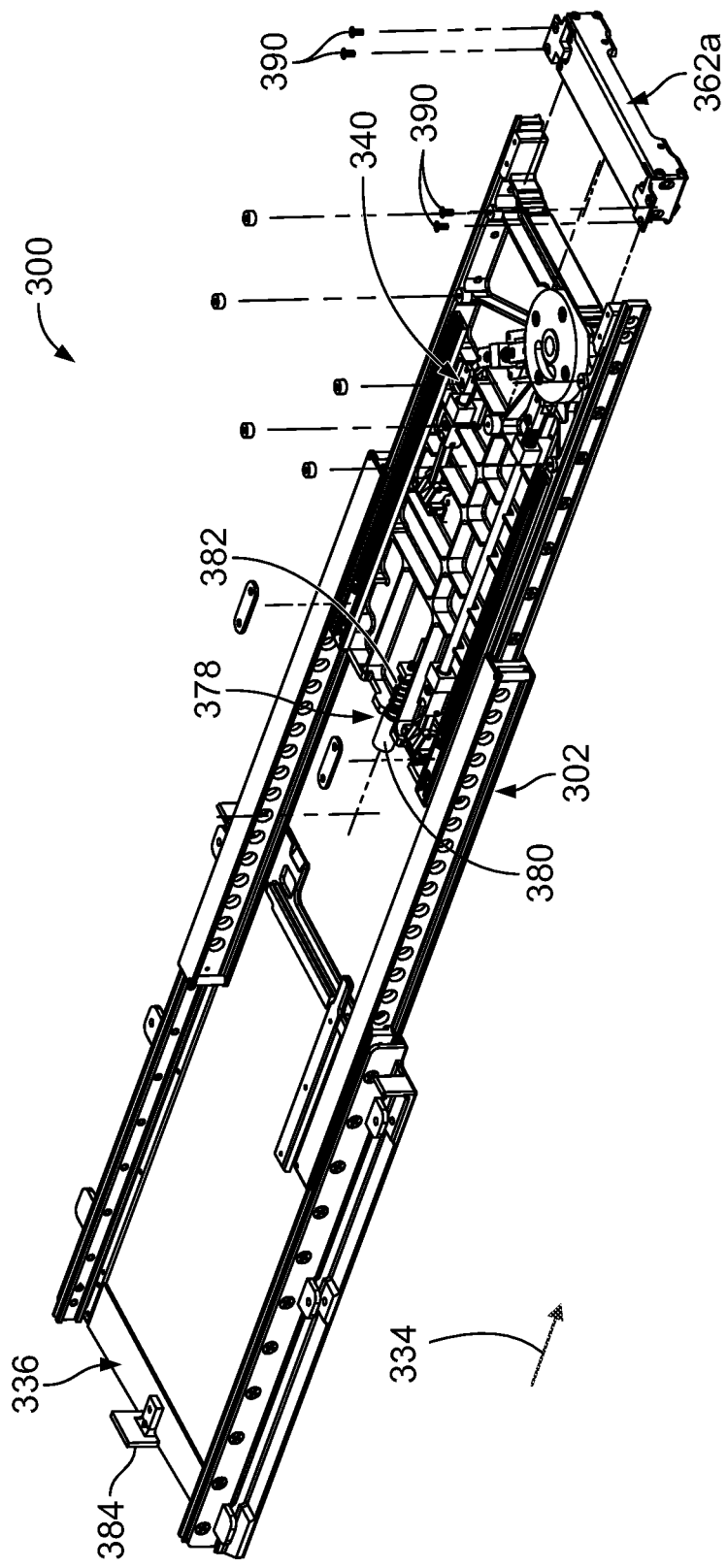
FIG. 17 is a partially exploded perspective view of a portion of a slide-out tray table according to another implementation.

Another implementation of the biasing mechanism 178 is illustrated in FIG. 17. Specifically, FIG. 17 illustrates another implementation of a slide-out tray table 300 that includes a base 302 having base plates 336 and 340. The tray table 300 includes a biasing mechanism 378 configured to bias the base 302 from a stowed position (also referred to herein as a "retracted position") of the tray table 300 toward an extended position of the tray table 300. The biasing mechanism 378 includes a plunger 380 and a coil spring 382 that are mounted to the base plate 340.

The plunger 380 and the coil spring 382 of the biasing mechanism 378 are operatively connected to the base 302 such that the biasing mechanism 378 biases the base 302 in a direction 334 when the tray table 300 is in the stowed position. Specifically, the plunger 380 and the coil spring 382 are configured to engage a tab 384 of the base plate 336 when the tray table 300 is in the stowed position thereof such that the biasing mechanism 378 provides a bias that biases the base 302 in the direction 334 toward the extended position of the tray table 300.

Referring again to FIGS. 1 and 2, the tray table 100 may be configured as a cartridge that is configured to be interchangeably mounted to the seating structure of the aircraft (e.g., the seating structure 112 of the aircraft 110 shown in FIG. 3, etc.), for example using a snap fit, an interference fit, one or more threaded fasteners, a clip, etc. In the exemplary implementation, the tray table 100 is configured to be mounted to the seating structure using four threaded fasteners (not shown) and four mounting tabs 184. The cartridge configuration of the tray table 100 enables the tray table 100 to be relatively quickly and easily removed from the seating structure, for example for maintenance, repair, replacement, and/or the like. Configuring the tray table 100 as a cartridge may therefore reduce labor and thus maintenance costs of the aircraft.

Figure 18:
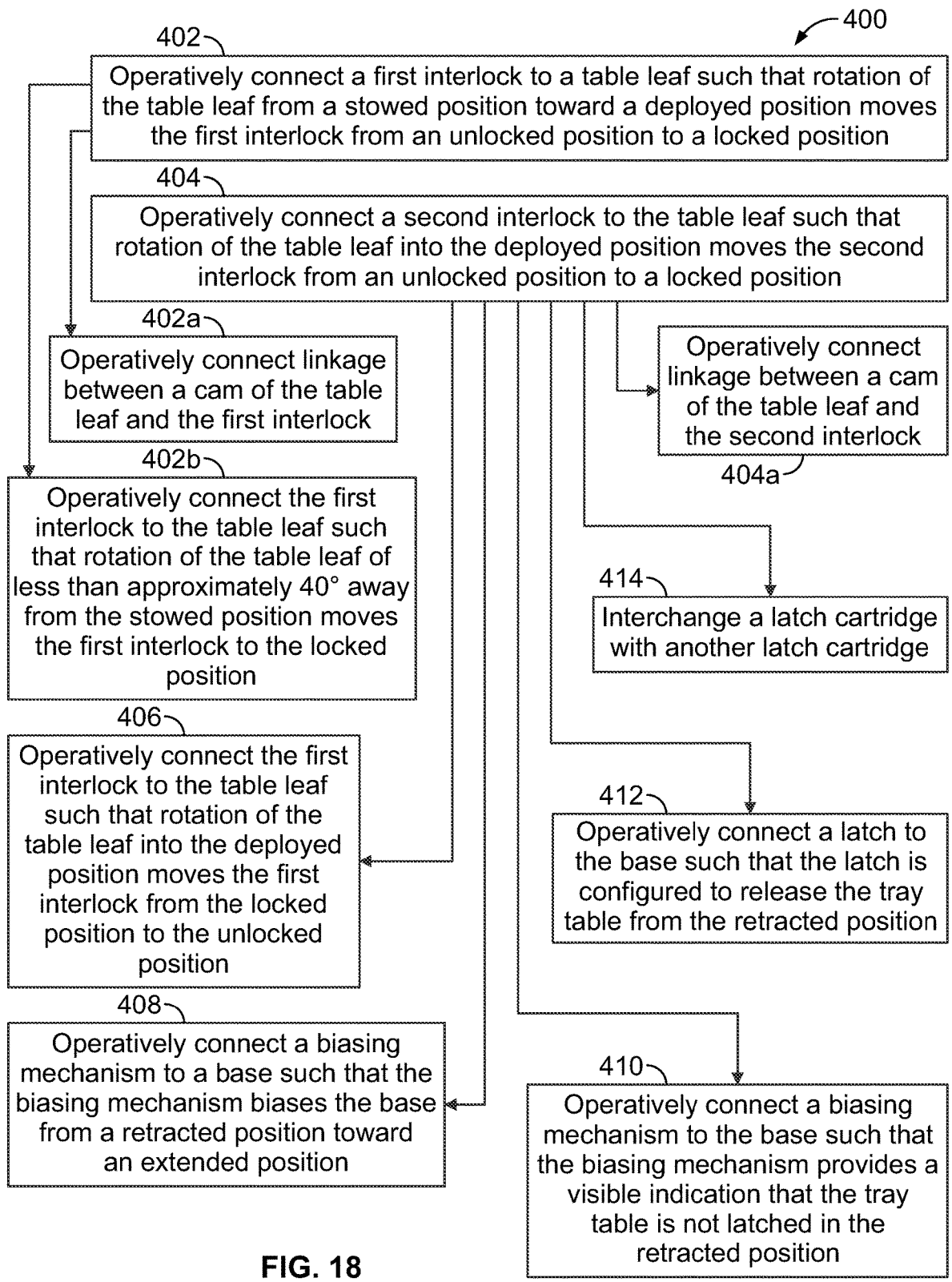
FIG. 18 is a flow chart illustrating a method of configuring a slide-out tray table for an aircraft according to an implementation.

FIG. 18 illustrates a method 400 of configuring a slide-out tray table (e.g., the slide-out tray table 100 shown in FIGS. 1-15, the slide-out tray table 200 shown in FIG. 16, the slide-out tray table 300 shown in FIG. 17, etc.) for an aircraft (e.g., the aircraft 110 shown in FIGS. 3 and 4A-4E, the aircraft 500 shown in FIG. 19, etc.) according to an implementation. The method 400 includes operatively connecting, at 402, a first interlock of the tray table to a table leaf of the tray table such that rotation of the table leaf from a stowed position toward a deployed position of the table leaf moves the first interlock from an unlocked position of the first interlock to a locked position of the first interlock. At 404, the method 400 includes operatively connecting a second interlock of the tray table to the table leaf such that rotation of the table leaf into the deployed position moves the second interlock from an unlocked position of the second interlock to a locked position of the second interlock. At 406, the method 400 optionally includes operatively connecting the first interlock to the table leaf such that rotation of the table leaf into the deployed position moves the first interlock from the locked position of the first interlock to the unlocked position of the first interlock.

In some implementations, operatively connecting at 402 the first interlock to the table leaf includes operatively connecting, at 402a, linkage between a cam of the table leaf and the first interlock. In addition or alternatively, operatively connecting at 404 the second interlock to the table leaf includes operatively connecting, at 404a, linkage between a cam of the table leaf and the second interlock. In some implementations, operatively connecting, at 402, the first interlock to the table leaf includes operatively connecting, at 402b, the first interlock to the table leaf such that rotation of the table leaf of less than approximately 40° away from the stowed position moves the first interlock to the locked position of the first interlock.

Optionally, the method 400 further includes operatively connecting, at 408, a biasing mechanism to a base of the tray table such that the biasing mechanism biases the base from a retracted position toward an extended position of the tray table. The method 400 optionally further includes operatively connecting, at 410, a biasing mechanism to the base of the tray table such that the biasing mechanism provides a visible indication that the tray table is not latched in the retracted position of the tray table.

In some implementations, the method 400 further includes operatively connecting, at 412, a latch to the base of the tray table such that the latch is configured to release the tray table from the retracted position of the tray table when the tray table is pulled away from the retracted position toward the extended position of the tray table.

Some implementations of the method 400 further include interchanging, at 414, a latch cartridge of the tray table with another latch cartridge of the tray table.

Figure 19:
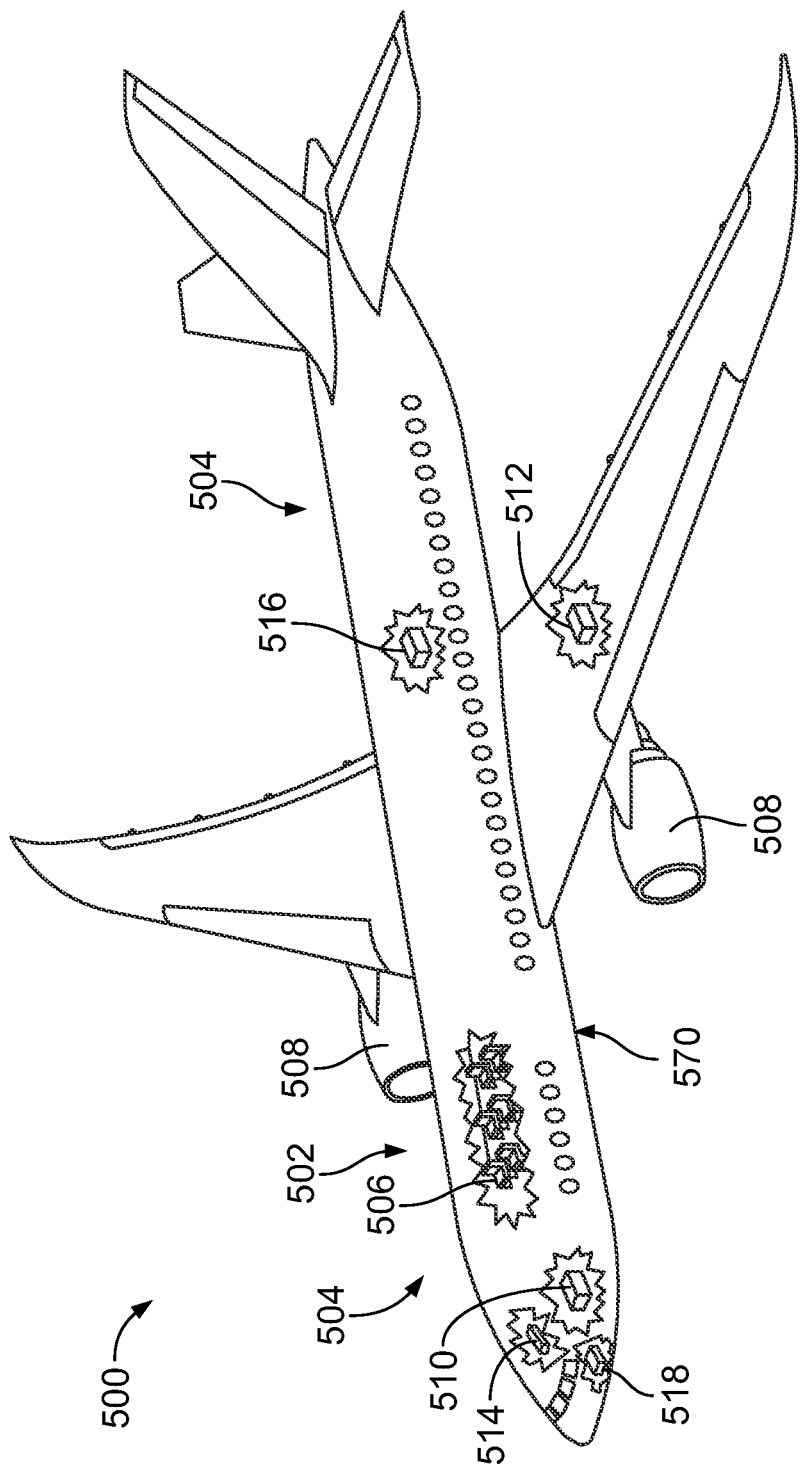
FIG. 19 is a schematic view of an implementation of an aircraft.

Referring now to FIG. 19, examples of the disclosure may be described in the context of using the slide-out tray tables disclosed herein on an aircraft 500 that includes an airframe 502 having a fuselage 570. The aircraft 500 includes a plurality of high-level systems 404 and an interior 506. Examples of high-level systems 504 include one or more of a propulsion system 508, an electrical system 510, a hydraulic fluid system 512, a control system 514, and an environmental system 516. Any number of other systems can be included. Although a fixed wing passenger aircraft is shown, the slide-out tray tables disclosed herein can be used with any other type of aircraft, such as, but not limited to, transport aircraft, military aircraft, rotorcraft (e.g., helicopters, etc.), lighter than air vehicles (e.g., balloons, etc.), and/or the like. Moreover, although an aerospace example is shown, the present disclosure can be applied to other industries, such as, but not limited to, the automotive industry, the marine industry, etc.

The following clauses describe further aspects:

Clause Set A:

A1. An interlock assembly for a tray table of an aircraft, the interlock assembly comprising:
a first interlock configured to be moved from an unlocked position to a locked position by rotation of a table leaf of the tray table from a stowed position toward a deployed position of the table leaf, the first interlock being configured to be moved from the locked position of the first interlock to the unlocked position of the first interlock by rotation of the table leaf into the deployed position; and
a second interlock configured to be moved from an unlocked position of the second interlock to a locked position of the second interlock by rotation of the table leaf into the deployed position.

A2. The interlock assembly of clause A1, further comprising linkage configured to be operatively connected between the first interlock and the table leaf such that the linkage translates rotation of the table leaf into linear motion to thereby move the first interlock between the unlocked and positions.

A3. The interlock assembly of clause A1, further comprising linkage configured to be operatively connected between the second interlock and the table leaf such that the linkage translates rotation of the table leaf into linear motion to thereby move the second interlock between the unlocked and positions.

A4. The interlock assembly of clause A1, wherein the locked position of the first interlock is configured to engage a stop of the tray table to limit movement of the tray table toward a retracted position of the tray table when the table leaf is in an intermediate position between the stowed and deployed positions of the table leaf.

A5. The interlock assembly of clause A1, wherein the locked position of the second interlock is configured to engage a stop of the tray table to limit movement of the tray table past an egress position of the tray table when the table leaf is in the deployed position.

A6. The interlock assembly of clause A1, wherein the unlocked position of the first interlock is configured to engage a base plate of the tray table to limit rotation of the table leaf from the deployed position toward the stowed position when the tray table is in an egress position of the tray table.

A7. The interlock assembly of clause A1, wherein the first interlock is configured to be moved to the locked position of the first interlock by rotation of the table leaf of less than approximately 40° away from the stowed position of the table leaf.

A8. The interlock assembly of clause A1, wherein at least one of the first interlock or the second interlock rotates between the unlocked and locked positions.

Clause Set B:

B1. A slide-out tray table for an aircraft, the tray table comprising:
a telescoping base configured to expand outwardly and retract inwardly between an extended position and a retracted position of the tray table;
a table leaf mounted to the base such that the table leaf is slidable between the extended and retracted positions of the tray table, the table leaf being selectively rotatably between a stowed position and a deployed position; and
an interlock assembly comprising:
   a first interlock movable between an unlocked position and a locked position, the first interlock being operatively connected to the table leaf such that rotation of the table leaf from the stowed position toward the deployed position moves the first interlock to the locked position; and
   a second interlock movable between an unlocked position and a locked position of the second interlock, the second interlock being operatively connected to the table leaf such that rotation of the table leaf into the deployed position moves the second interlock to the locked position of the second interlock.

B2. The slide-out tray table of clause B1, wherein rotation of the table leaf into the deployed position moves the first interlock from the locked position of the first interlock to the unlocked position of the first interlock.

B3. The slide-out tray table of clause B1, further comprising a biasing mechanism operatively connected to the base such that the biasing mechanism biases the base from the retracted position toward the extended position of the tray table.

B4. The slide-out tray table of clause B1, further comprising a biasing mechanism operatively connected to the base such that the biasing mechanism provides a visible indication that the tray table is not latched in the retracted position.

B5. The slide-out tray table of clause B1, further comprising a latch configured to releasably hold the tray table in the retracted position, the latch comprising an actuator configured to release the tray table from the retracted position when the tray table is pulled away from the retracted position toward the extended position of the tray table.

B6. The slide-out tray table of clause B1, further comprising a latch configured to releasably hold the tray table in the retracted position, the latch comprising a cartridge configured to be interchangeably mounted to the base.

B7. The slide-out tray table of clause B1, wherein the table leaf comprises a cam, the interlock assembly further comprising linkage operatively connected between the first interlock and the cam of the table leaf such that the linkage translates rotation of the table leaf into linear motion to thereby move the first interlock between the unlocked and positions.

B8. The slide-out tray table of clause B1, wherein the table leaf comprises a cam, the interlock assembly further comprising linkage operatively connected between the second interlock and the cam of the table leaf such that the linkage translates rotation of the table leaf into linear motion to thereby move the second interlock between the unlocked and positions.

B9. The slide-out tray table of clause B1, wherein the locked position of the first interlock is configured to engage a stop of the base to limit movement of the tray table toward the retracted position of the tray table when the table leaf is in an intermediate position between the stowed and deployed positions of the table leaf.

B10. The slide-out tray table of clause B1, wherein the locked position of the second interlock is configured to engage a stop of the base to limit movement of the tray table toward the retracted position past an egress position of the tray table when the table leaf is in the deployed position.

B11. The slide-out tray table of clause B1, wherein the tray table comprises an egress position between the retracted and extended positions, the unlocked position of the first interlock being configured to engage a base plate of the base to limit rotation of the table leaf from the deployed position toward the stowed position when the tray table is in the egress position.

B12. The slide-out tray table of clause B1, wherein the first interlock is configured to be moved to the locked position of the first interlock by rotation of the table leaf of less than approximately 40° away from the stowed position of the table leaf B13. The slide-out tray table of clause B1, wherein at least one of the first interlock or the second interlock rotates between the unlocked and locked positions.

Clause Set C:

C1. A method of configuring a slide-out tray table for an aircraft, the method comprising:
operatively connecting a first interlock of the tray table to a table leaf of the tray table such that rotation of the table leaf from a stowed position toward a deployed position of the table leaf moves the first interlock from an unlocked position of the first interlock to a locked position of the first interlock; and
operatively connecting a second interlock of the tray table to the table leaf such that rotation of the table leaf into the deployed position moves the second interlock from an unlocked position of the second interlock to a locked position of the second interlock.

C2. The method of clause C1, further comprising operatively connecting the first interlock to the table leaf such that rotation of the table leaf into the deployed position moves the first interlock from the locked position of the first interlock to the unlocked position of the first interlock.

C3. The method of clause C1, further comprising operatively connecting a biasing mechanism to a base of the tray table such that the biasing mechanism biases the base from a retracted position toward an extended position of the tray table.

C4. The method of clause C1, further comprising operatively connecting a biasing mechanism to a base of the tray table such that the biasing mechanism provides a visible indication that the tray table is not latched in a retracted position of the tray table.

C5. The method of clause C1, further comprising operatively connecting a latch to a base of the tray table such that the latch is configured to release the tray table from a retracted position of the tray table when the tray table is pulled away from the retracted position toward an extended position of the tray table.

C6. The method of clause C1, further comprising interchanging a latch cartridge of the tray table with another latch cartridge of the tray table.

C7. The method of clause C1, wherein at least one of operatively connecting the first interlock to the table leaf or operatively connecting the second interlock to the table leaf comprises operatively connecting linkage between a cam of the table leaf and the first interlock or the second interlock, respectively.

C8. The method of clause C1, wherein operatively connecting the first interlock to the table leaf comprises operatively connecting the first interlock to the table leaf such that rotation of the table leaf of less than approximately 40° away from the stowed position moves the first interlock to the locked position of the first interlock.

Clause Set D:

D1. An aircraft comprising:
a seat; and
a slide-out tray table mounted adjacent the seat, the tray table comprising:
- a telescoping base configured to expand outwardly and retract inwardly between an extended position and a retracted position of the tray table;
- a table leaf mounted to the base such that the table leaf is slidable between the extended and retracted positions of the tray table, the table leaf being selectively rotatably between a stowed position and a deployed position; and
- an interlock assembly comprising:
  - a first interlock movable between an unlocked position and a locked position, the first interlock being operatively connected to the table leaf such that rotation of the table leaf from the stowed position toward the deployed position moves the first interlock to the locked position; and
  - a second interlock movable between an unlocked position and a locked position of the second interlock, the second interlock being operatively connected to the table leaf such that rotation of the table leaf into the deployed position moves the second interlock to the locked position of the second interlock.

D2. The aircraft of clause D1, wherein rotation of the table leaf into the deployed position moves the first interlock from the locked position of the first interlock to the unlocked position of the first interlock.

D3. The aircraft of clause D1, further comprising a biasing mechanism operatively connected to the base such that the biasing mechanism biases the base from the retracted position toward the extended position of the tray table.

D4. The aircraft of clause D1, further comprising a biasing mechanism operatively connected to the base such that the biasing mechanism provides a visible indication that the tray table is not latched in the retracted position.

D5. The aircraft of clause D1, further comprising a latch configured to releasably hold the tray table in the retracted position, the latch comprising an actuator configured to release the tray table from the retracted position when the tray table is pulled away from the retracted position toward the extended position of the tray table.

D6. The aircraft of clause D1, further comprising a latch configured to releasably hold the tray table in the retracted position, the latch comprising a cartridge configured to be interchangeably mounted to the base.

D7. The aircraft of clause D1, wherein the table leaf comprises a cam, the interlock assembly further comprising linkage operatively connected between the first interlock and the cam of the table leaf such that the linkage translates rotation of the table leaf into linear motion to thereby move the first interlock between the unlocked and positions.

D8. The aircraft of clause D1, wherein the table leaf comprises a cam, the interlock assembly further comprising linkage operatively connected between the second interlock and the cam of the table leaf such that the linkage translates rotation of the table leaf into linear motion to thereby move the second interlock between the unlocked and positions.

D9. The aircraft of clause D1, wherein the locked position of the first interlock is configured to engage a stop of the base to limit movement of the tray table toward the retracted position of the tray table when the table leaf is in an intermediate position between the stowed and deployed positions of the table leaf.

D10. The aircraft of clause D1, wherein the locked position of the second interlock is configured to engage a stop of the base to limit movement of the tray table toward the retracted position past an egress position of the tray table when the table leaf is in the deployed position.

D11. The aircraft of clause D1, wherein the tray table comprises an egress position between the retracted and extended positions, the unlocked position of the first interlock being configured to engage a base plate of the base to limit rotation of the table leaf from the deployed position toward the stowed position when the tray table is in the egress position.

D12. The aircraft of clause D1, wherein the first interlock is configured to be moved to the locked position of the first interlock by rotation of the table leaf of less than approximately 40° away from the stowed position of the table leaf.

D13. The aircraft of clause D1, wherein at least one of the first interlock or the second interlock rotates between the unlocked and locked positions.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation (e.g., different steps, etc.) is within the scope of aspects and implementations of the disclosure.

The term "comprising" is used in this specification to mean including the feature(s) or act(s) followed thereafter, without excluding the presence of one or more additional features or acts. The terms "comprising," "including," and "having" are intended to be inclusive and mean that there can be additional elements other than the listed elements. In other words, the use of "including," "comprising," "having," "containing," "involving," and variations thereof, is meant to encompass the items listed thereafter and additional items. Further, references to "one embodiment" or "one implementation" are not intended to be interpreted as excluding the existence of additional embodiments or implementations that also incorporate the recited features. The term "exemplary" is intended to mean "an example of".

When introducing elements of aspects of the disclosure or the examples thereof, the articles "a," "an," "the," and "said" are intended to mean that there are one or more of the elements. In other words, the indefinite articles "a", "an", "the", and "said" as used in the specification and in the claims, unless clearly indicated to the contrary, should be understood to mean "at least one."

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An interlock assembly for a tray table of an aircraft, the interlock assembly comprising:
 a first interlock configured to be moved from an unlocked position to a locked position by rotation of a table leaf of the tray table from a stowed position toward a deployed position of the table leaf, the first interlock being configured to be moved from the locked position of the first interlock to the unlocked position of the first interlock by rotation of the table leaf into the deployed position; and
 a second interlock configured to be moved from an unlocked position of the second interlock to a locked position of the second interlock by rotation of the table leaf into the deployed position.

2. The interlock assembly of claim 1, further comprising:
 linkage configured to be operatively connected between the first interlock and the table leaf such that the linkage translates rotation of the table leaf into linear motion to thereby move the first interlock between the unlocked and locked positions.

3. The interlock assembly of claim 1, further comprising:
 linkage configured to be operatively connected between the second interlock and the table leaf such that the linkage translates rotation of the table leaf into linear motion to thereby move the second interlock between the unlocked and locked positions.

4. The interlock assembly of claim 1, wherein the locked position of the first interlock is configured to engage a stop of the tray table to limit movement of the tray table toward a retracted position of the tray table when the table leaf is in an intermediate position between the stowed and deployed positions of the table leaf.

5. The interlock assembly of claim 1, wherein the locked position of the second interlock is configured to engage a stop of the tray table to limit movement of the tray table past an egress position of the tray table when the table leaf is in the deployed position.

6. The interlock assembly of claim 1, wherein the unlocked position of the first interlock is configured to engage a base plate of the tray table to limit rotation of the table leaf from the deployed position toward the stowed position when the tray table is in an egress position of the tray table.

7. The interlock assembly of claim 1, wherein at least one of the first interlock or the second interlock rotates between the unlocked and locked positions.

8. A slide-out tray table for an aircraft, the tray table comprising:
 a telescoping base configured to expand outwardly and retract inwardly between an extended position and a retracted position of the tray table;
 a table leaf mounted to the base such that the table leaf is slidable between the extended and retracted positions of the tray table, the table leaf being selectively rotatably between a stowed position and a deployed position; and
 an interlock assembly comprising:
  a first interlock movable between an unlocked position and a locked position, the first interlock being operatively connected to the table leaf such that rotation of the table leaf from the stowed position toward the deployed position moves the first interlock to the locked position; and
  a second interlock movable between an unlocked position and a locked position of the second interlock, the second interlock being operatively connected to the table leaf such that rotation of the table leaf into the deployed position moves the second interlock to the locked position of the second interlock.

9. The slide-out tray table of claim 8, wherein rotation of the table leaf into the deployed position moves the first interlock from the locked position of the first interlock to the unlocked position of the first interlock.

10. The slide-out tray table of claim 8, further comprising:
 a biasing mechanism operatively connected to the base such that the biasing mechanism biases the base from the retracted position toward the extended position of the tray table.

11. The slide-out tray table of claim 8, wherein the table leaf comprises a cam, the interlock assembly further comprising linkage operatively connected between the first interlock and the cam of the table leaf such that the linkage translates rotation of the table leaf into linear motion to thereby move the first interlock between the unlocked and locked position.

12. The slide-out tray table of claim 8, wherein the table leaf comprises a cam, the interlock assembly further comprising linkage operatively connected between the second interlock and the cam of the table leaf such that the linkage translates rotation of the table leaf into linear motion to thereby move the second interlock between the unlocked and locked positions.

13. The slide-out tray table of claim 8, wherein the locked position of the first interlock is configured to engage a stop of the base to limit movement of the tray table toward the retracted position of the tray table when the table leaf is in an intermediate position between the stowed and deployed positions of the table leaf.

14. The slide-out tray table of claim 8, wherein the locked position of the second interlock is configured to engage a stop of the base to limit movement of the tray table toward the retracted position past an egress position of the tray table when the table leaf is in the deployed position.

15. The slide-out tray table of claim 8, wherein the tray table comprises an egress position between the retracted and extended positions, the unlocked position of the first interlock being configured to engage a base plate of the base to limit rotation of the table leaf from the deployed position toward the stowed position when the tray table is in the egress position.

16. A method of configuring a slide-out tray table for an aircraft, the method comprising:
   operatively connecting a first interlock of the tray table to a table leaf of the tray table such that rotation of the table leaf from a stowed position toward a deployed position of the table leaf moves the first interlock from an unlocked position of the first interlock to a locked position of the first interlock; and
   operatively connecting a second interlock of the tray table to the table leaf such that rotation of the table leaf into the deployed position moves the second interlock from an unlocked position of the second interlock to a locked position of the second interlock.

17. The method of claim 16, further comprising:
   operatively connecting the first interlock to the table leaf such that rotation of the table leaf into the deployed position moves the first interlock from the locked position of the first interlock to the unlocked position of the first interlock.

18. The method of claim 16, further comprising:
   operatively connecting a biasing mechanism to a base of the tray table such that the biasing mechanism provides a visible indication that the tray table is not latched in a retracted position of the tray table.

19. The method of claim 16, further comprising:
   interchanging a latch cartridge of the tray table with another latch cartridge of the tray table.

20. The method of claim 16, wherein operatively connecting the first interlock to the table leaf comprises operatively connecting the first interlock to the table leaf such that rotation of the table leaf of less than approximately 40° away from the stowed position moves the first interlock to the locked position of the first interlock.

* * * * *